United States Patent
Ilincic et al.

(10) Patent No.: US 11,122,082 B2
(45) Date of Patent: *Sep. 14, 2021

(54) SYSTEM AND METHOD FOR SECOND FACTOR AUTHENTICATION OF CUSTOMER SUPPORT CALLS

(71) Applicant: Capital One Services, LLC, McLean, VA (US)

(72) Inventors: Rajko Ilincic, Annandale, VA (US); Kaitlin Newman, Washington, DC (US); Jeffrey Rule, Chevy Chase, MD (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 156 days.

This patent is subject to a terminal disclaimer.

(21) Appl. No.: 16/597,845

(22) Filed: Oct. 9, 2019

(65) Prior Publication Data

US 2020/0304542 A1   Sep. 24, 2020

Related U.S. Application Data

(63) Continuation of application No. 16/357,266, filed on Mar. 18, 2019, now Pat. No. 10,523,708.

(51) Int. Cl.
*G06F 21/44* (2013.01)
*H04L 29/06* (2006.01)
(Continued)

(52) U.S. Cl.
CPC ............ *H04L 63/18* (2013.01); *H04L 9/3242* (2013.01); *H04L 63/0853* (2013.01);
(Continued)

(58) Field of Classification Search
CPC ... G06F 21/31; G06F 21/44; H04L 2463/082; H04L 63/08
See application file for complete search history.

(56) References Cited

U.S. PATENT DOCUMENTS 7,373,515 B2 *   5/2008   Owen ..................... G06F 21/31
                                                         713/182
9,894,199 B1    2/2018   Wiechman et al.
(Continued)

OTHER PUBLICATIONS

International Search Report and Written Opinion for International Patent Application No. PCT/US2020/023134 dated May 20, 2020, 13 pages.

(Continued)

*Primary Examiner* — Izunna Okeke
(74) *Attorney, Agent, or Firm* — Kacvinsky Daisak Bluni PLLC

(57) ABSTRACT

A system and method are disclosed that leverage multi-factor authentication features of a service provider and intelligent call routing to increase security and efficiency at a customer call center. Pre-authentication of customer support requests reduces the potential for misappropriation of sensitive customer data during call handling. A contactless card uniquely associated with a client may provide a second factor of authentication via a backchannel to reduce the potential for malicious third-party impersonation of the client prior to transfer of the call to the customer call center. Pre-authorized customer support calls may be intelligently and efficiently routed directly to call center agents, without incurring further delay. During call handling, call center agents may initiate further client authentication processes, including contactless card authentication requests, over one or more different communication channels for authorizing access to sensitive information or to allay suspicion.

20 Claims, 13 Drawing Sheets

(51) Int. Cl.
  *H04W 12/06* (2021.01)
  *H04M 3/51* (2006.01)
  *H04L 9/32* (2006.01)
(52) U.S. Cl.
  CPC ......... *H04M 3/5175* (2013.01); *H04W 12/06* (2013.01); *H04L 2463/082* (2013.01)

(56) References Cited

U.S. PATENT DOCUMENTS

| | | | |
|---|---|---|---|
| 2007/0203850 A1 | 8/2007 | Singh et al. | |
| 2008/0086767 A1* | 4/2008 | Kulkarni | H04L 9/3215 726/9 |
| 2008/0120711 A1* | 5/2008 | Dispense | H04L 63/08 726/7 |
| 2009/0217039 A1 | 8/2009 | Kurapati et al. | |
| 2010/0257357 A1* | 10/2010 | McClain | H04W 12/068 713/155 |
| 2014/0020073 A1 | 1/2014 | Ronda et al. | |
| 2014/0161258 A1 | 6/2014 | Yang et al. | |
| 2015/0019442 A1 | 1/2015 | Hird et al. | |
| 2017/0103664 A1 | 4/2017 | Wong et al. | |
| 2017/0337542 A1 | 11/2017 | Kim et al. | |

OTHER PUBLICATIONS

Crowe et al., "Is Payment Tokenization Ready for Primetime? Perspectives from Industry Stakeholders on the Tokenization Landscape", Bostonfed.org [online], retrieved from Internet URL: <https://www.bostonfed.org/-/media/Documents/PaymentStrategies/tokenization-prime-time.pdf>, retrieved on May 19, 2020, 51 pages.
International Search Report and Written Opinion for International Patent Application No. PCT/US2020/022809 dated May 18, 2020, 11 pages.

* cited by examiner

SYSTEM AND METHOD FOR SECOND FACTOR AUTHENTICATION OF CUSTOMER SUPPORT CALLS

RELATED APPLICATIONS

This application is a continuation of U.S. patent application Ser. No. 16/357,266, entitled "SYSTEM AND METHOD FOR PRE-AUTHENTICATION OF CUSTOMER SUPPORT CALLS" filed on Mar. 18, 2019. The contents of the aforementioned application are incorporated herein by reference.

BACKGROUND

Call center services are typically provided by service providers to enable clients to access, modify, delete or otherwise control their accounts. From a security standpoint call centers can be the riskiest areas of an enterprise because call center transactions may expose sensitive customer information to malicious third parties. Up to 90% of the calls received on any given day at customer call centers are from fraudulent callers attempting to improperly gain access to customer accounts.

To address these security concerns, the Payment Card Industry Security Standards Council (PCI SSC) manages the ongoing evolution of the Payment Card Industry (PCI) security standards. Service providers are responsible for enforcing compliance with PCI standards to protect sensitive customer data. For example, the PCI standards may dictate authentication standards to be followed prior to permitting a client to access and/or modify customer account information. Call centers may require client authentication in the form of exchange of passwords, answers to personal questions, biometric data or the like. However, authentication techniques are often undesirably subject to issues such as "spoofing" and "phishing" where imposters mask or modify incoming numbers, email addresses, IP addresses, etc., to pose as clients in an attempt to steal information or funds. External risks are also posed by hackers that monitor service provider communications, in particular, call center communications, for the purpose of stealing customer information.

SUMMARY

According to one aspect, a device for authenticating information access requests includes a customer service interface configured to receive an authentication request from a customer service agent, where the authentication request may be associated with an access request received by the customer service agent from a device of a client over a first communication channel. The authentication request may be used to determine whether the device is authorized to access information sought by the access request. The device further includes a storage device configured to store client data comprising pre-verified contact information for the client, a client interface configured to push a second factor authentication request to the client over a second communication channel established using the pre-verified contact information. The client interface may also be configured to receive an authentication response from the client. The second communication channel may be different from the first communication channel. The device includes an authentication server, coupled to the customer service interface and client interface, for generating the second factor authentication request, and, in response to a match between the authentication response and the stored client data, for selectively unlocking access to the information sought by the access request.

According to another aspect, a method for authenticating access requests received by customer service agents includes the step of receiving an authentication request from a customer service agent, where the authentication request is associated with an access request received by the customer service agent from a device of a client over a first communication channel. The authentication request may be used to determine whether the device may access information sought by the access request. The method includes the steps of retrieving client data including pre-verified contact information for the client from a data store and pushing an authentication request to the device over a second communication channel using the pre-verified contact information. The authentication request may comprise a request for a second factor authentication from the client. The method includes the steps of receiving a second factor authentication response from the device over the second communication channel, comparing the second factor authentication response to the client data and selectively authenticating the client in response to the step of comparing, including selectively unlocking access to the information sought by the access request.

According to a further aspect, a method for authenticating information access requests received by a customer service agent includes the steps of receiving an authentication request from a customer service agent, the authentication request associated with an access request received by the customer service agent over a first communication channel from a device of a client. The first communication channel may include a session identifier and the authentication request may be used to determine whether the device is permitted to access information sought by the client access request. The method includes the steps of retrieving pre-verified client contact information for the client from a data store and pushing an authentication request to the device using a second communication channel established using the pre-verified contact information, where the second communication channel may differ from the first communication channel. The authentication request may include a request for a cryptogram from a contactless card of the client, and the method includes the step of authenticating the access request including receiving the cryptogram from the client device over the second communication channel, decrypting the cryptogram using a copy of a key associated with the client to provide decrypted counter information, comparing the decrypted counter information to a copy of a counter maintained for the client, and selectively authenticating the client device in response to the step of comparing, including selectively unlocking access to the information. The method further includes the step of notifying the client of the access request using a third communication channel generated in response to the pre-validated contact information, wherein the third communication channel is different from both the first and second communication channels.

Using different communication channels for exchanging authentication information prior to allowing access to customer data decreases the potential for disclosure of sensitive customer information because malicious parties will be unable to interrupt all of the client communication interfaces.

DETAILED DESCRIPTION

Figure 1A:
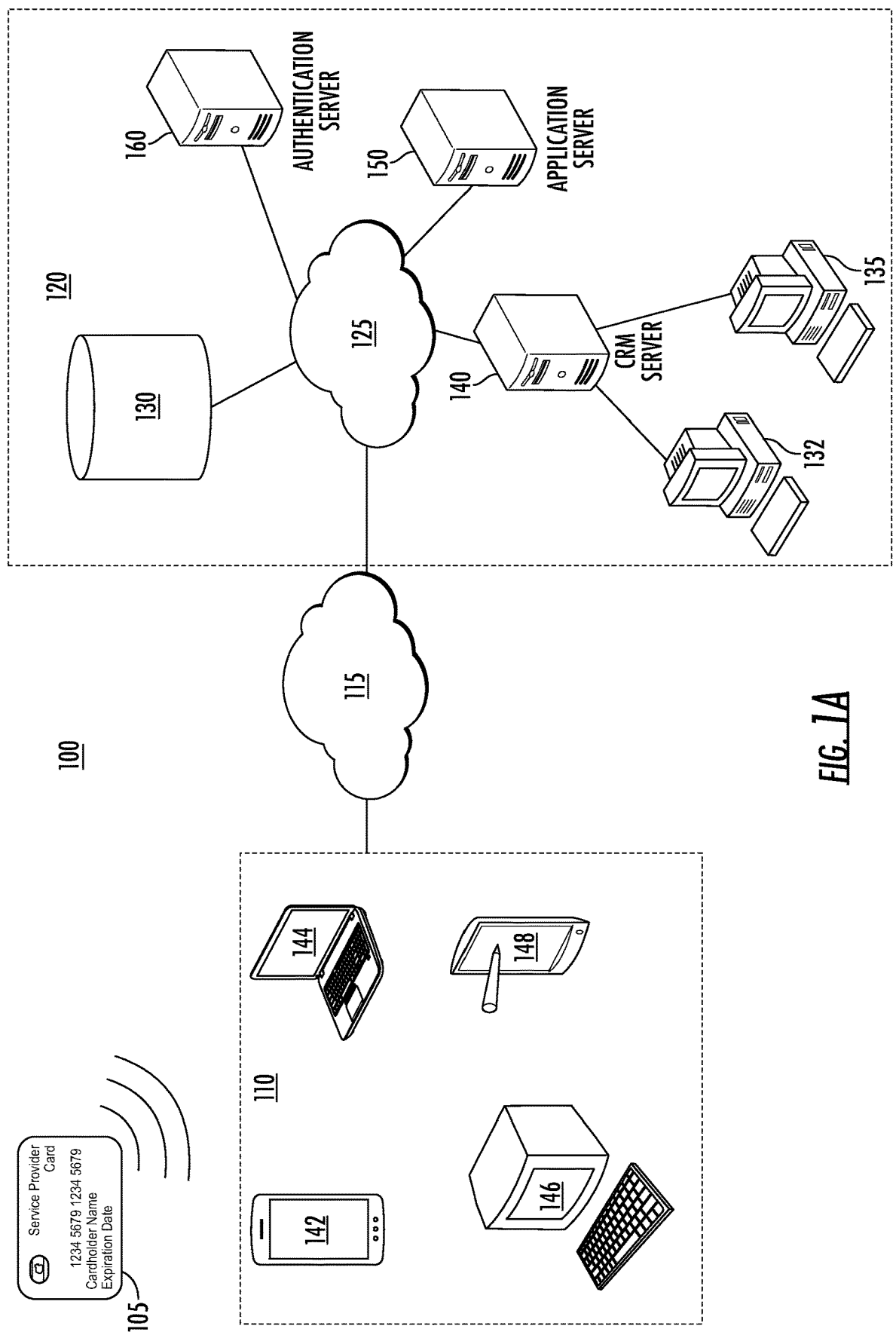
FIG. 1A is a block diagram of a data transmission system configured to pre-authenticate customer requests according to an example embodiment.

An objective of some embodiments of the present disclosure is the use of one or more keys that have been incorporated into one or more contactless cards as described in U.S. patent application(s) Ser. No. 16/205,119 filed Nov. 29, 2018 by Osborn, et. al, entitled "Systems and Methods for Cryptographic Authentication of Contactless Cards" and incorporated herein by reference (hereinafter the '119 application). The contactless card may be used to perform authentication and numerous other functions that may otherwise require the user to carry a separate physical token in addition to the contactless card. By employing a contactless interface, contactless cards may be provided with a method to interact and communicate between a user's device (such as a mobile phone) and the card itself. For example, the EMV protocol, which underlies many credit card transactions, includes an authentication process which suffices for operating systems for Android® but presents challenges for iOS,®, which is more restrictive regarding near field communication (NFC) usage, as it can be used only in a read-only manner. Unlike RFID which may be used to read devices in motion to at a significant distance. Exemplary embodiments of the contactless cards described in the '119 application may utilize NFC technology.

Accordingly, a system and method are disclosed that leverage multi-factor authentication features of a service provider and intelligent call routing to increase security and efficiency at a customer call center. Pre-authentication of customer support requests reduces the potential for misappropriation of sensitive customer data during call handling. A contactless card uniquely associated with a client may provide a second factor of authentication to reduce the potential for malicious third-party impersonation of the client. Pre-authorized customer support calls are intelligently and efficiently routed in a manner that reduces the opportunity for malicious call interference and information theft.

According to another aspect, it is recognized that during handling of customer service requests it may be beneficial for a customer service representative to further authenticate the client. Such further authentication may be performed for a variety of reasons including prior to allowing modification of highly sensitive data, including passwords and contact information or allowing access to certain services, such as loan services and the like. Further authentication may also be desired in the event that a customer is transferred between customer service agents or a customer service agent becomes suspicious of the authenticity of the client that seeks access to client information.

According to one aspect, authentication may be performed using communication channels and protocols other than those that are used to request the information access. In some embodiments, the communication channels are established using client contact information that has been pre-validated by the service provider. In some embodiments, after access is granted, the client may be notified of such access using another communication method, such as email or text messaging. Using different communication channels and protocols for various stages of authentication limits the potential for malicious third-party interference because of the difficulties that would be faced by such party to simultaneously interfere with each of the communication mediums used for authentication.

These and other features of the invention will now be described with reference to the figures, wherein like reference numerals are used to refer to like elements throughout.

As used in this application, the terms "system", "component" and "unit" are intended to refer to a computer-related entity, either hardware, a combination of hardware and software, software, or software in execution, examples of which are described herein. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

FIG. 1A illustrates a system 100 including one or more client devices 110 coupled to a service provider 120 via a network 115. According to one aspect, the client devices 110 comprise network-enabled computers and communicate with the service provider 120 via networks 115 and 125 to access service provider content and services.

As referred to herein, a network-enabled computer may include, but is not limited to: e.g., a computer device, or communications device including, e.g., a server, a network appliance, a personal computer (PC), a workstation, a mobile device, a phone, a handheld PC, a personal digital assistant (PDA), a thin client device, a fat client device, an Internet browser, or other device.

The client devices 110 thus can include a processor and a memory, and it is understood that the processing circuitry may contain additional components, including processors, memories, error and parity/CRC checkers, data encoders, anti-collision algorithms, controllers, command decoders, security primitives and tamper-proofing hardware, as necessary to perform the functions described herein. The client device 110 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

One or more client devices 110 also may be a mobile device for example, such as an iPhone, iPod, iPad from Apple® or any other mobile device running Apple's iOS operating system, any device running Microsoft's Windows® Mobile operating system, and/or any other smartphone or like wearable mobile device.

Various client devices 110 of FIG. 1A include a cellular phone 142, a laptop 144, a tablet 148 and a terminal 146. Client devices 110 may include a thin client application specifically adapted for communication with the service provider 120. The thin client application may be stored in a memory of the client device and be operable when executed upon by the client device to control an interface between the client device and a service provider application, permitting a user at the client device to access service provider content and services.

In some examples, network 115 may be one or more of a wireless network, a wired network or any combination of wireless network and wired network and may be configured to connect client device 110 to service provider 120. For example, network 115 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 115 may include, without limitation, telephone lines, fiber optics, IEEE Ethernet 902.3, a wide area network ("WAN"), a wireless personal area network ("WPAN"), a local area network ("LAN"), or a global network such as the Internet. In addition, network 115 may support an Internet network, a wireless communication network, a cellular network, or the like, or any combination thereof. Network 115 may further include one network, or any number of the exemplary types of networks mentioned above, operating as a stand-alone network or in cooperation with each other. Network 115 may utilize one or more protocols of one or more network elements to which they are communicatively coupled. Network 115 may translate to or from other protocols to one or more protocols of network devices.

It should be appreciated that according to one or more examples, network 115 may be part of a plurality of interconnected networks, such as, for example, the Internet, a service provider's private network 125, a cable television network, corporate networks, such as credit card association networks, and home networks. In addition, private network 125 may be implemented as a virtual private network layered upon network 115.

Service provider 120 is, in one embodiment, a business providing computer-based services to clients over a network 115. Almost all modern service providers use the internet to provide service offerings to potential consumers. The service offerings are generally provided in the form of software applications which operate using dedicated resources of the service provider. The combination of the software and hardware that provides a particular service to a client is referred to herein as a 'server'. The servers may communicate over a private network 125 of the service provider, often referred to as a corporate or enterprise network. The private network 125 may comprise a wireless network, a wired network or any combination of wireless network and wired network as described above with regard to network 115.

In the system of FIG. 1A, service provider 120 is shown to include an application server 150, an authentication server 160, and a Customer Relationship Management (CRM) server 140. Although each server is illustrated as a discrete device, it is appreciated that the applications and servers may be distributed throughout the enterprise or, in the case of distributed resources such as 'cloud' resources, throughout the network 115. The application server 150 may support one or more application services provided by the service provider 120, for example account management services. The CRM server 140 may be used to provide customer support services to clients of the service provider 120, including the processing and forwarding of incoming calls from clients to one or more call handling agents at working at workstations 132, 135.

Database 130 comprises data storage resources that may be used, for example, to store customer account, credential and other authentication information for use by the application server 150 and the authentication server 160. The database 130 may be comprised of coupled data resources comprising any combination of local storage, distributed data center storage or cloud-based storage.

According to one aspect, a contactless card 105 may be in wireless communication, for example, near field communication (NFC), with one or more client devices 110. For example, contactless card 105 may comprise one or more chips, such as a radio frequency identification chip, configured to communicate via NFC or other short-range protocols. In other embodiments, contactless card 105 may communicate with client devices 110 through other means including, but not limited to, Bluetooth, satellite, and/or WiFi. As described in the '119 application, contactless card 105 may be configured to communicate with one of a card reader terminal 146, a cellular phone 142, a laptop 144 and/or a tablet 148 through NFC when the contactless card 105 is within range of the respective client device. As will be described in more detail below, the contactless card 105 may include key and counter information that may be transformed using cryptographic algorithms to generate a cryptogram that may be used by the service provider to authenticate the client device.

Figure 1B:
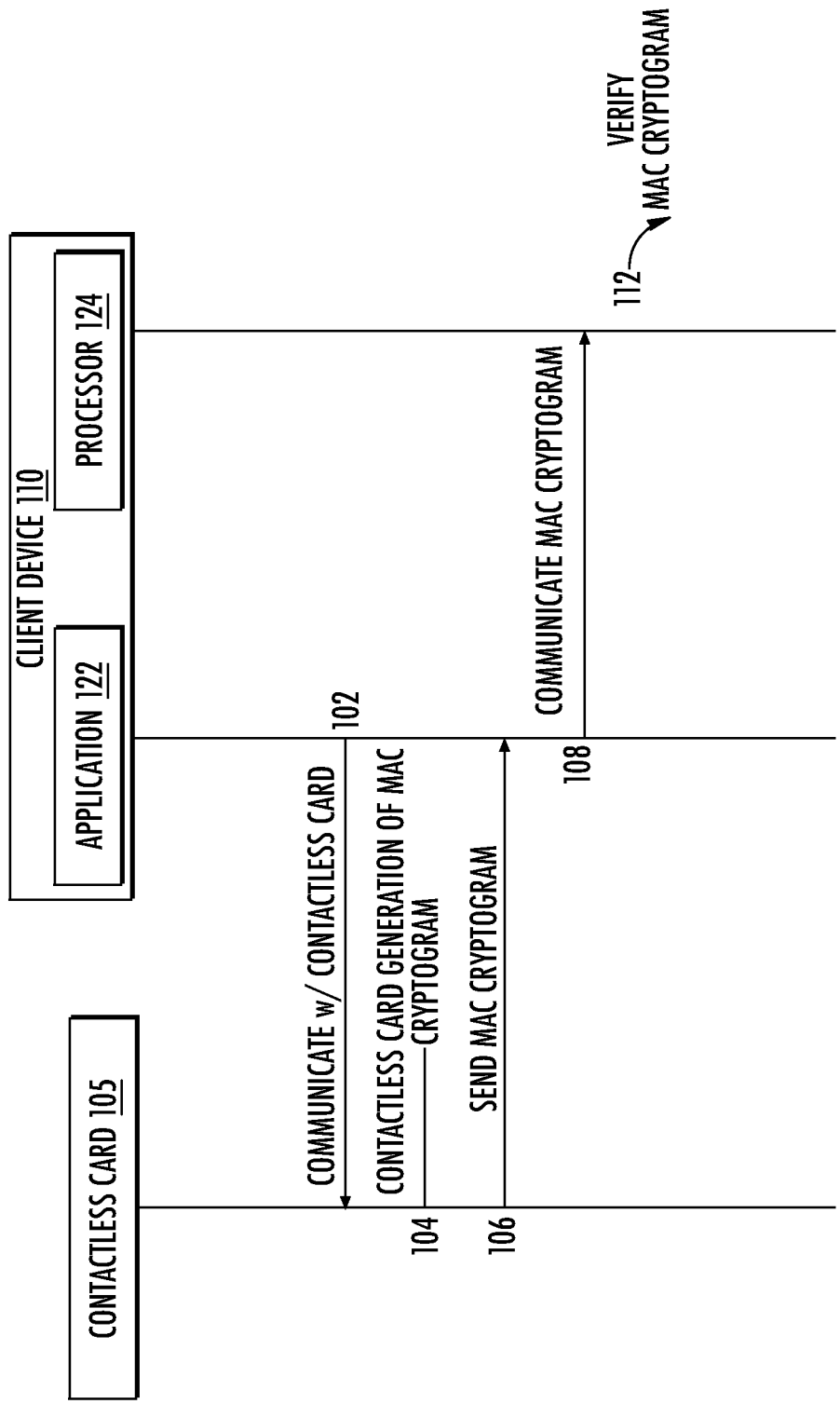
FIG. 1B is a diagram illustrating a sequence for providing authenticated access according to an example embodiment.

FIG. 1B is a timing diagram illustrating an example sequence for providing authenticated access according to one or more embodiments of the present disclosure. System 100 may comprise contactless card 105 and client device 110, which may include an application 122 and processor 124. FIG. 1B may reference similar components as illustrated in FIG. 1A.

At step 102, the application 122 communicates with the contactless card 105 (e.g., after being brought near the contactless card 105). Communication between the application 122 and the contactless card 105 may involve the contactless card 105 being sufficiently close to a card reader (not shown) of the client device 110 to enable NFC data transfer between the application 122 and the contactless card 105.

At step 104, after communication has been established between client device 110 and contactless card 105, the contactless card 105 generates a message authentication code (MAC) cryptogram. In some examples, this may occur when the contactless card 105 is read by the application 122. In particular, this may occur upon a read, such as an NFC read, of a near field data exchange (NDEF) tag, which may be created in accordance with the NFC Data Exchange Format. For example, a reader, such as application 122, may transmit a message, such as an applet select message, with the applet ID of an NDEF producing applet. Upon confirmation of the selection, a sequence of select file messages followed by read file messages may be transmitted. For example, the sequence may include "Select Capabilities file", "Read Capabilities file", and "Select NDEF file". At this point, a counter value maintained by the contactless card 105 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message).

In some examples, the MAC cryptogram may be transmitted as an NDEF tag, and in other examples the MAC cryptogram may be included with a uniform resource indicator (e.g., as a formatted string).

In some examples, application 122 may be configured to transmit a request to contactless card 105, the request comprising an instruction to generate a MAC cryptogram.

At step 106, the contactless card 105 sends the MAC cryptogram to the application 122. In some examples, the transmission of the MAC cryptogram occurs via NFC, however, the present disclosure is not limited thereto. In other examples, this communication may occur via Bluetooth, Wi-Fi, or other means of wireless data communication.

At step 108, the application 122 communicates the MAC cryptogram to the processor 124.

At step 112, the processor 124 verifies the MAC cryptogram pursuant to an instruction from the application 122. For example, the MAC cryptogram may be verified, as explained below.

In some examples, verifying the MAC cryptogram may be performed by a device other than client device 110, such as a service provider 120 in data communication with the client device 110 (as shown in FIG. 1A). For example, processor 124 may output the MAC cryptogram for transmission to service provider 120, which may verify the MAC cryptogram.

In some examples, the MAC cryptogram may function as a digital signature for purposes of verification. Other digital signature algorithms, such as public key asymmetric algorithms, e.g., the Digital Signature Algorithm and the RSA algorithm, or zero knowledge protocols, may be used to perform this verification.

More specifically, according to one aspect, a contactless card 105 may be used in conjunction with first authentication credentials provided to an application service provider to pre-authenticate a customer support request, prior to forwarding the support request to the CRM server 140. Pre-authentication of customer support requests in this manner provides a dual advantage; because authentication information is not forwarded to the CRM, the opportunity for misappropriation of such information by a call center agent is obviated. In addition, the use of the contactless card as a second factor of authentication enables the association of a particular device/phone number with a specific individual (i.e., the owner of the card), thereby removing the ability for a malicious third party to 'spoof', i.e., impersonate, the client. According to another aspect, pre-authentication communication protocols described below identify or use specific communication channels for call handling, thereby reducing the opportunity for client impersonation.

Example embodiments of systems and methods described herein may be configured to provide multi-factor security authentication which may be used to bypass authentication by CRM server 40, thereby reducing the potential for theft of sensitive customer information during call handling.

The security factor authentication may comprise a plurality of processes. A first authentication process may comprise logging in and validating a user via one or more applications executing on a device. A second authentication process may operate following successful login and validation to cause a user to engage in one or more behaviors associated with one or more contactless cards. In effect, the security factor authentication process comprises a multi-factor authentication process that may include both securely proving identity of the user and encouraging the user to engage in one or more types of behaviors, including but not limited to one or more tap gestures, associated with the contactless card. In some examples, the one or more tap gestures may comprise a tap of the contactless card by the user to a device. In some examples, the device may comprise a mobile device, a kiosk, a terminal, a tablet, or any other device configured to process a received tap gesture.

For example, to provide a first layer of authentication, a client may access the website of the service provider by linking to a service provider web page using an internet browser application executing on the client device. The browser is a software application such as Google® Chrome®, Internet Explorer®, Safari®, etc., and includes programming code for translating Hypertext Markup Language (HTML) web pages of the service provider application to a format suitable for to a client operating the client device. As part of accessing the service provider website, the service provider may request first authorization information, including password information, answers to pre-stored queries, biometric information, an image, or other mechanism of verifying that a user of the client device is authorized to access content and services, including accounts, managed by the service provider.

Certain high-risk services of provided by the service provider, such as call center support, may benefit from multi-factor authentication. For example, service providers may store first level authentication information within a client's browser as a cookie to speed up authentication processes during client login. Browser cookies, and the associated password or other data, are vulnerable to discovery and misuse. Thus, prior to allowing the user to access or modify highly sensitive or personal information, as can happen during customer support calls, it is important to validate that the user has the authority for the access.

According to one aspect, the contactless card 105 may be used to provide a second authentication for a user of a client device. In one embodiment, and as described in more detail below, the contactless card includes a key, a counter, and cryptographic processing functionality that may be used to generate a cryptogram that may be used to validate a user of a client device. The counter advantageously reflects previous behaviors of the holder of the card. For example, the counter may reflect the number of times that the user has previously accessed a particular service of the service provider, information which is virtually impossible for a malicious third party to garner accurately.

According to one aspect, and as described in more detail below, cryptogram exchange occurs using backchannel communications, wherein for the purposes herein a 'backchannel' is a communication channel established between a client and an authentication server for exchange of authentication tokens. In some embodiments, the communication channel used for backchannel authentication is different from the application communication channel established between a service provider application server and a client. For example, communications between a client and a service provider over a service provider web interface may be authenticated using a backchannel call, text or email issued directly to a pre-validated client contact. In other embodiments, the communication channel may leverage information (such as session information) from the application communication channel when establishing the backchannel communication link.

When a client seeks access to a high-risk service, in some embodiments that service provides application may prompt the user to provide the second level of authentication using the contactless card 105, for example as mentioned above communicatively coupling the card 105 to one of the client devices 110 by tapping or otherwise.

Following the second authentication, and as will be described in more detail below, the service provider returns data to the client device. The data may include data allowing the client to initiate a communication link with the CRM server 140. Such data may include contact information, such as a link to a CRM service provider application, or a phone number for a call center. In some embodiments, the contact information may be augmented with control information for the CRM or call center. For example, control information may direct the CRM or call center to bypass any authentication or Interactive Voice Response (IVR) processes typically performed at the call center to account for the fact that the client has already been pre-authenticated by the service provider application/contactless card multi-factor authentication process.

It should be noted that although in the above description the first authentication is described as using personal, biometric, questions or other authentication information, it is recognized that in some examples, a client application executing on a device may respond to a tap of a contactless card to initially activate or launch the application of the device. In such examples, both the first and second authentication processes use the key/counter contactless card authentication process described in more detail below. In some embodiments, if the client-side application is not installed on a client device, a tap of the contactless card proximate the card reader may initiate a download of the application, (such as navigation to a download page of the application). Subsequent to installation, a tap of the contactless card may activate or launch the application, and then initiate, for example via the application or other back-end communication), activation of the contactless card. In some examples, the one or more applications may be configured to determine that it was launched via one or more tap gestures of the contactless card, such that a launch occurred at 3:51 pm, that a transaction was processed or took place at 3:56 pm, in order to verify the identity of the user.

In some examples, data may be collected on tap behaviors as biometric/gestural authentication. For example, a unique identifier that is cryptographically secure and not susceptible to interception may be transmitted to one or more backend services. The unique identifier may be configured to look up secondary information about the individual. The secondary information may comprise personally identifiable information about the user, including but not limited to social security information, query responses, passwords, account information and the like. In some examples, the secondary information may be stored within the contactless card.

Figure 2:
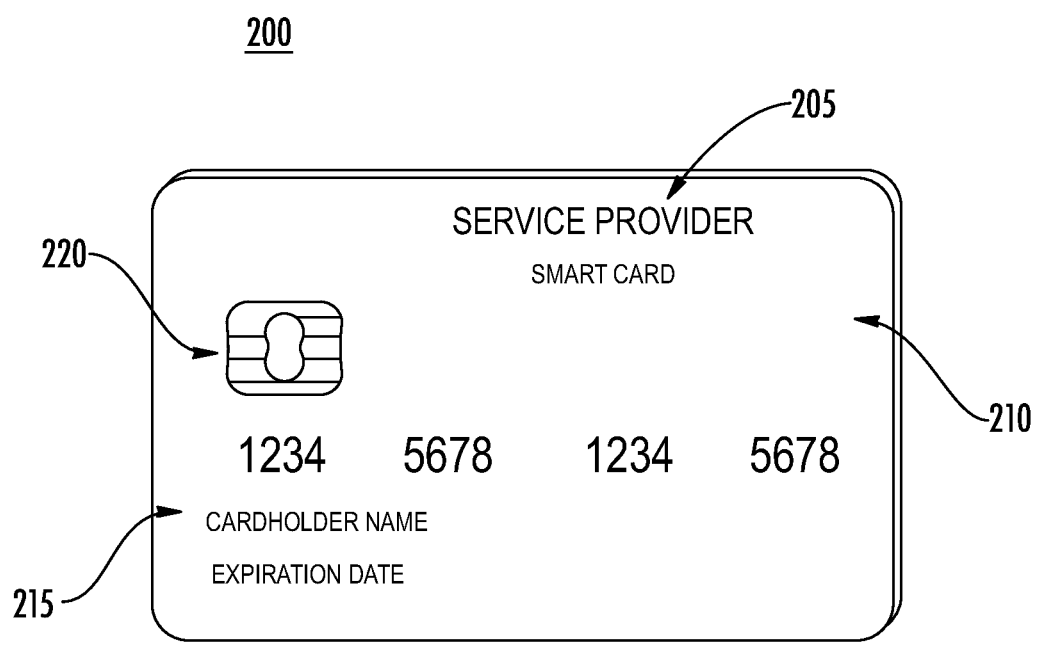
FIG. 2 is an example of a contactless card for storing authentication information that may be used in the system of FIG. 1A.

FIG. 2 illustrates one or more contactless cards 200, which may comprise a payment card, such as a credit card, debit card, or gift card, issued by a named service provider 205 displayed on the front or back of the card. In some examples, the contactless card 200 is not related to a payment card, and may comprise, without limitation, an identification card. In some examples, the payment card may comprise a dual interface contactless payment card. The contactless card 200 may comprise a substrate 210, which may include a single layer, or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 300 may have physical characteristics compliant with the ID-1 format of the ISO/IEC 7810 standard, and the contactless card may otherwise be compliant with the ISO/IEC 14443 standard. However, it is understood that the contactless card 200 according to the present disclosure may have different characteristics, and the present disclosure does not require a contactless card to be implemented in a payment card.

The contactless card 200 may also include identification information 215 displayed on the front and/or back of the card, and a contact pad 220. The contact pad 220 may be configured to establish contact with another communication device, such as a user device, smart phone, laptop, desktop, or tablet computer. The contactless card 200 may also include processing circuitry, antenna and other components not shown in FIG. 2. These components may be located behind the contact pad 220 or elsewhere on the substrate

210. The contactless card 200 may also include a magnetic strip or tape, which may be located on the back of the card (not shown in FIG. 2).

Figure 3:
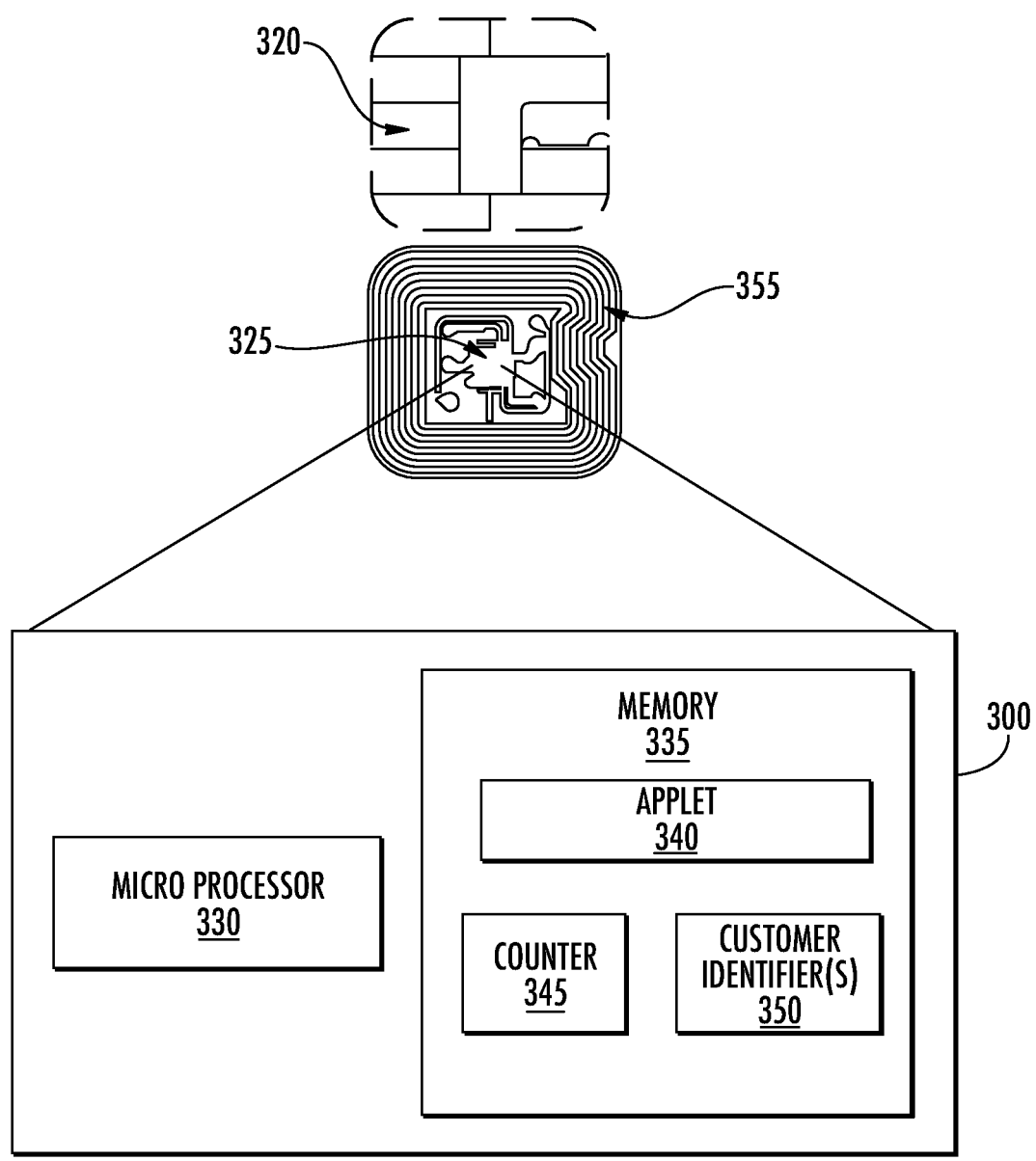
FIG. 3 is a detailed block diagram illustrating exemplary components of the contactless card of FIG. 2.

As illustrated in FIG. 3, the contact pad 320 of FIG. 3A may include processing circuitry 325 for storing and processing information, including a microprocessor 330 and a memory 335. It is understood that the processing circuitry 325 may contain additional components, including processors, memories, error and parity/CRC checkers, data encoders, anti-collision algorithms, controllers, command decoders, security primitives and tamper-proofing hardware, as necessary to perform the functions described herein.

The memory 335 may be a read-only memory, write-once read-multiple memory or read/write memory, e.g., RAM, ROM, and EEPROM, and the contactless card 300 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times.

The memory 335 may be configured to store one or more applets 340, one or more counters 345, and a customer identifier 350. The one or more applets 340 may comprise one or more software applications configured to execute on one or more contactless cards, such as Java Card applet. However, it is understood that applets 340 are not limited to Java Card applets, and instead may be any software application operable on contactless cards or other devices having limited memory. The one or more counters 345 may comprise a numeric counter sufficient to store an integer. The customer identifier 350 may comprise a unique alphanumeric identifier assigned to a user of the contactless card 300, and the identifier may distinguish the user of the contactless card from other contactless card users. In some examples, the customer identifier 350 may identify both a customer and an account assigned to that customer and may further identify the contactless card associated with the customer's account.

The processor and memory elements of the foregoing exemplary embodiments are described with reference to the contact pad, but the present disclosure is not limited thereto. It is understood that these elements may be implemented outside of the pad 320 or entirely separate from it, or as further elements in addition to processor 330 and memory 335 elements located within the contact pad 320.

In some examples, the contactless card 300 may comprise one or more antennas 355. The one or more antennas 355 may be placed within the contactless card 300 and around the processing circuitry 325 of the contact pad 320. For example, the one or more antennas 355 may be integral with the processing circuitry 325 and the one or more antennas 355 may be used with an external booster coil. As another example, the one or more antennas 355 may be external to the contact pad 320 and the processing circuitry 325.

In an embodiment, the coil of contactless card 300 may act as the secondary of an air core transformer. The terminal may communicate with the contactless card 300 by cutting power or amplitude modulation. The contactless card 300 may infer the data transmitted from the terminal using the gaps in the contactless card's power connection, which may be functionally maintained through one or more capacitors. The contactless card 300 may communicate back by switching a load on the contactless card's coil or load modulation. Load modulation may be detected in the terminal's coil through interference.

As explained above, the contactless cards 300 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange (NDEF) requests, from a reader, such as a mobile NFC reader, and produce an NDEF message that comprises a cryptographically secure OTP encoded as an NDEF text tag.

Figure 4:
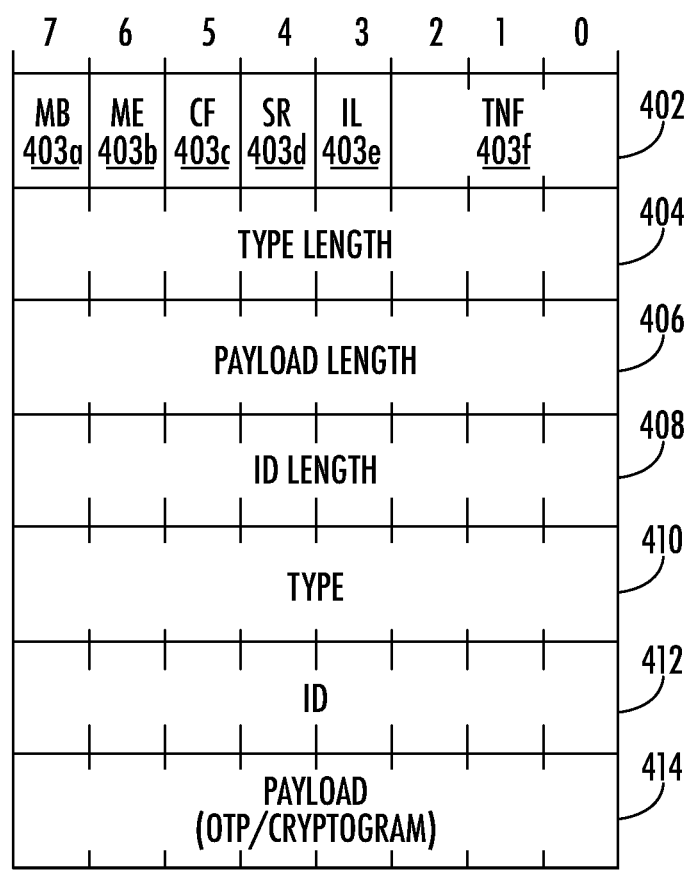
FIG. 4 is a diagram of exemplary fields of messages exchanged between a contactless card and a client device of FIG. 1A.

FIG. 4 illustrates an exemplary NDEF short-record layout (SR=1) 400 according to an example embodiment. An NDEF message provides a standardized method for a client device 110 to communicate with a contactless card 105. In some examples, NDEF messages may comprise one or more records. The NDEF record 400 includes a header 402 which includes a plurality of flags that define how to interpret the rest of the record, including a Message Begin (MB) flag 403a a Message End (ME) flag 403b, a Chunk flag (CF) 403c, a Short Record (SR) flag 403d, an ID Length (IL) flag 403e and a Type Name Format (TNF) field 403f. MB 403a and ME flag 403b may be set to indicate the respective first and last record of the message. CF 403c and IL flag 403e provide information about the record, including respectively whether the data is 'chunked' (data spread among multiple records within a message) or whether the ID length 408 is relevant. SR flag 403d may be set when the message includes only one record.

The TNF field 403f identifies the type of content that the field contains, as defined by the NFC protocol. These types include empty, well known (data defined by the Record Type Definition (RTD) of the NFC forum), Multipurpose Internet Mail Extensions (MIME) [as defined by RFC 2046], Absolute Uniform Resource Identifier (URI) [as defined by RFC 3986], external (user defined), unknown, unchanged [for chunks] and reserved.

Other fields of an NFC record include type length 404, payload length 406, ID length 408, Type 410, ID 412 and Payload 414. contains the length of the payload type in bytes. Type length field 404 specifies the precise kind of data found in the payload. Payload Length 406 contains the length of the payload in bytes. A record may contain up to 4,294,967,295 bytes (or 2^32−1 bytes) of data. ID Length 408 contains the length of the ID field in bytes. Type 410 identifies the type of data that the payload contains. ID 412 provides the means for external applications to identify the whole payload carried within an NDEF record. Payload 414 comprises the message.

In some examples, data may initially be stored in the contactless card by implementing STORE DATA (E2) under a secure channel protocol. This data may include a personal User ID (pUID) that is unique to the card, as well as one or more of an initial key, cryptographic processing data including session keys, data encryption keys, random numbers and other values that will be described in more detail below. These values may be used to generate a message authentication code (MAC) that may be used to pre-authenticate a client prior to customer service handling.

Exemplary information that may be exchanged with the contactless card 105 and an authentication server 160 during initialization to populate the contactless card to support secure authentication according to various aspects are shown in Table I below.

TABLE 1

| Item | Length (bytes) | Encrypted? | Notes |
|---|---|---|---|
| pUID | 8 | No | Unique Card ID |
| AutKey | 16 | Yes | 3DES Key for Deriving MAC session keys |
| AutKCV | 3 | No | Key Check Value |
| DEKKey | 16 | Yes | 3DES Key for deriving Encryption session key |
| DEKKCV | 3 | No | Key Check Value |
| Card Shared Random | 4 bytes | No | 4 Byte True Random number (pre-generated) |
| NTLV | X Bytes | No | TLV data for NDEF message |

Following initialization both the contactless card and authentication server store information for uniquely identifying the cardholder. These features may be used according to one aspect to authenticate clients access to high-risk services as described below.

Figure 5:
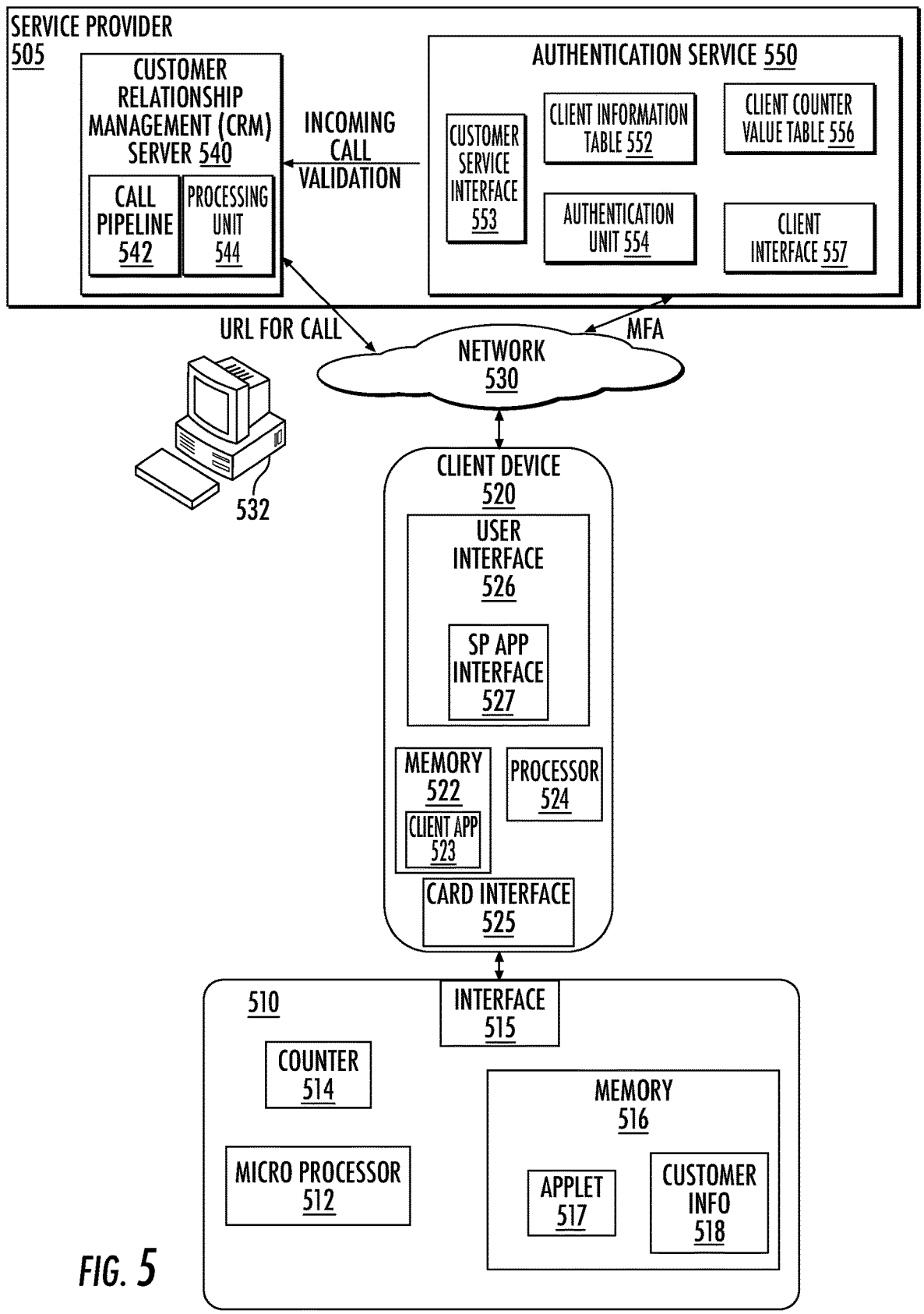
FIG. 5 a detailed block diagram of components of the system of FIG. 1A that may be utilized to support aspects of the invention.

FIG. 5 illustrates a communication system in which a contactless card 510 may store information such as that included in Table 1 may be used to authenticate a user prior to connecting the user with a high-risk service of the service provider. In one aspect, a 'high-risk service' is one which may benefit from multi-factor authentication processes due to the opportunity for the service to expose sensitive customer or other information. As described with regard to FIG. 3, each contactless card may include a memory 516 for storing customer information 518 including one or more uniquely identifying attributes, such as identifiers, keys, random numbers and the like. In one aspect, the memory further includes an authentication applet 517 operable when executed upon by microprocessor 512 for controlling authentication processes described herein. In addition, each contactless card 510 may include one or more application transaction counters (ATC) 514, and an interface 515. As described above, in one embodiment the interface operates NFC or other communication protocols.

Client device 520 also includes a card interface 525 for communicating with the contactless card, and one or more other network interfaces (not shown) that permit the client device 520 to communicate with a service provider using a variety of communication protocols as described above. The client device may further include a user interface 526, which may include one or more of a keyboard or touchscreen display, permitting communication between a service provider application and a user of the client device 520. Client device 520 further includes a memory 522 which stores information and program code controlling operation of the client device 520, including for example a client-side application 523 which may be provided to the client by a service provider to facilitate access to and use of service provider applications. In one embodiment, the client-side application 523 includes program code configured to communicate authentication information from the contactless card 510 to one or more services provided by the service provider. The client-side application 523 may be controlled via input received at a service provider (SP) application interface 527 displayed on user interface 526. For example, a user may select an icon, link or other mechanism provided as part of the SP application interface 527 to launch the client-side application to access SP application services.

As mentioned with regard to FIG. 1A, client device 520 may be connected to various services of provided by a service provider 505, including a Customer Relationship Manager (CRM) server 540 and an authentication server 550. In one embodiment, the CRM server 540 manages routing of received support calls and transfer of received calls to a call handling pipeline 542. Authentication server 550 includes a client information table 552 for storing information such as that of Table 1 for clients of a service provider. The authentication server 554 includes hardware and software for performing various authentication processes for clients using information from client counter value table 556. In one embodiment authentication server further is shown to include a client interface 557 for exchanging authentication messages with the client device and a customer service interface 553 for exchanging authentication messages with the CRM server 540. The authentication server may also include a client counter value table 556 which may be used as described below to perform authentication in conjunction with the contactless card 510.

Figure 6:
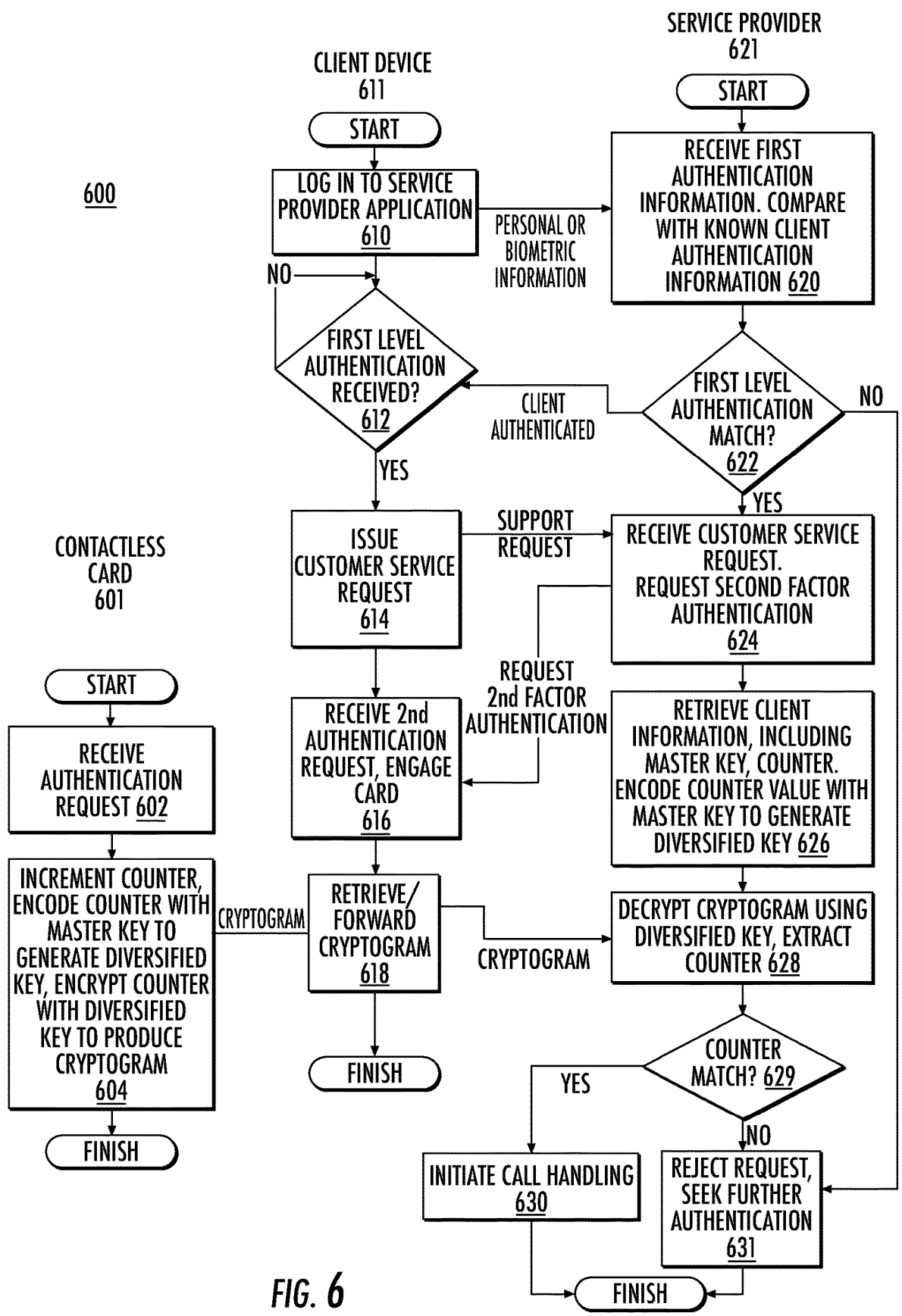
FIG. 6 is a data flow diagram provided to describe exemplary steps that may be performed in one embodiment by the components of FIG. 4 during call authentication according to aspects of the invention.

FIG. 6 illustrates various steps that may be performed by the contactless card 601, client device 611 and an authentication service of a service provider 621 which are configured to use key diversification techniques as part of a multi-factor authentication protocol for pre-authenticating clients. For example, a cardholder of contactless card 601 with access to a client device 611 may seek authentication from a service provider 621 to enable access to services, including seeking multi-factor authentication for access to high-risk services such as call center support.

At step 610, client device 611 first accesses a client account maintained by a service provider 621 by exchanging login credentials with the service provider, where the login credentials may include, but not be limited to, passwords, keys, biometric data, image data, query/response exchanges, etc. In one embodiment, the client may initiate this access by launching the client-side application via the SP application interface 527. Launching the app may include displaying a service provider web page configured to accept first credential information from the user.

In some embodiments, first level authentication may be performed using the cryptogram exchange process described below for second level authentication. The service provider app may be launched by tapping a contactless card 601 to the client device 611, initiating the cryptogram exchange as a precursor for permitting access to the service provider app.

The service provider receives the credentials at step 620 and compares these credentials against credentials for the client that are maintained by the authentication server. If the login credentials do not match at step 622, the service provider proceeds to step 631 to pursue authentication of the client device using other methods. If it is determined that there is a match at step 622, the client is authenticated, and the service provider coordinates with a client-side application maintained by client device 611 to display service provider web pages to the client to enable access to one or more services.

At step 614 the client device requests access to a high-risk application, for example, a customer service application. The client may request access, for example, by selecting one of a plurality of hyperlinks provided on a service provider website to direct the client to the selected service. The hyperlink may include, for example, a web address of a landing page for the service. Alternatively, the hyperlink may include a phone number of a customer support system.

Receiving the customer service request at step 624, the service provider determines that the selected service is a high-risk service that would benefit from a second level of authentication. For example, in an embodiment that provides second factor authentication using contactless cards, the service provider may prompt the client device to engage a contactless card to retrieve a cryptogram for verification purposes. The prompt may be any manner of indicating to the client that they should engage the contactless card, including textual prompts, visual prompts, audible prompts and other available indication mechanisms.

The client device 611 receives this request at step 616 and engages the contactless card. In one aspect, the client device uses NFC communication channels as described above to exchange messages with the contactless card the contactless card cooperates to provide second factor authentication through a combination of symmetric keys, symmetric cryptographic processing, and counters.

At step 602 the contactless card receives the authentication request. At step 604, processing components within the contactless card increment an application service transaction (AST) counter and encodes the counter using the Master Key stored in the contactless card using a symmetric cryptographic algorithm to produce a diversified key. The cryptographic algorithm may be selected from a group including at least one of a symmetric encryption algorithm, HMAC algorithm, and a CMAC algorithm. In some examples, the symmetric algorithm used to process the diversification value may comprise any symmetric cryptographic algorithm used as needed to generate the desired length diversified symmetric key. Non-limiting examples of the symmetric algorithm may include a symmetric encryption algorithm such as 3DES (Triple Data Encryption Algorithm) or Advanced Encryption Standard (AES) 128; a symmetric Hash Based Message Authentication (HMAC) algorithm, such as HMAC-SHA-256; and a symmetric cypher-based message authentication code (CMAC) algorithm such as AES-CMAC. It is understood that if the output of the selected symmetric algorithm does not generate a sufficiently long key, techniques such as processing multiple iterations of the symmetric algorithm with different input data and the same master key may produce multiple outputs which may be combined as needed to produce sufficient length keys.

Processing components of contactless card may take the selected cryptographic algorithm, and using the master symmetric key, process the counter value. For example, the contactless card 601 may select a symmetric encryption algorithm and use a counter which increments with every authentication transaction processed by the contactless card. Contactless card 601 may then encrypt the counter value with the selected symmetric encryption algorithm using the master symmetric key to generate a diversified symmetric key.

In one aspect, the diversified symmetric key may be used to process the counter prior for transmission for authorization purposes. For example, the contactless card 601 may encrypt the counter value using a symmetric encryption algorithm and the diversified symmetric key, with the output comprising an encrypted MAC cryptogram. The contactless card 601 may then transmit the cryptogram to the service provider 621 for authentication. In some examples, the counter value may not be encrypted. In these examples, the counter value may be transmitted between the transmitting device 205 and the receiving device 210 at block 230 without encryption.

In one embodiment, a template for an authentication message comprising a cryptogram may comprise a first record, with a well-known index for providing the actual dynamic authentication data. Table II below is one example of an authentication message that may be exchanged between client device 611 and contactless card 601.

TABLE II

| Byte Index | Value | Comment |
|---|---|---|
| 00 | D1 | Header {MB, ME, CF, SR, IL, TNF} |
| 02 | 48 | Payload Length including record ID |
| 03 | 54 | T |
| 04 | 02 | Record ID |
| 05 | 65 6E EN | (Language) |
| 07 | 43 01 00 76 a6 62 7b 67 a8 cf bb <8 MAC bytes> | |

In one example, if additional tags are to be added, the first byte may change to indicate message begin, but not end, and a subsequent record may be added. Because ID length is zero, ID length field and ID are omitted from the record. An example message shown in Table III below may include: UDK AUT key; Derived AUT session key (using 0x1234); Version 1.0; pATC=0x1234; RND=76a6627b67a8cfbb; MAC=<eight computed bytes>. The first column may comprise address/index into the NDEF message data.

TABLE III

| Message Format | | | | |
|---|---|---|---|---|
| 1 | 2 | 4 | 8 | 8 |
| 0x43 (Message Type 'A') | Version | pATC | RND | Cryptogram A (MAC) |

At step 618 the client device 611 receives the cryptogram and forwards it to service provider 621. At step 626, after the service provider requests $2^{nd}$-factor authentication at step 624, in one embodiment an authentication server of the service provider 621 retrieves client information associated with a cardholder of the contactless card associated with an account of the client using the client device. The client information may include a Master Key of the client and a counter of application service transactions of the contactless card. The service provider 621 encodes the retrieved counter value using the Master Key and a cryptographic algorithm that matches the cryptographic algorithm used by the contactless card to produce a service provider copy of a diversified key.

At step 628, the service provider uses the diversified key to decrypt the cryptogram to expose the counter value forwarded by the contactless card. At step 629, the service provider compares the exposed counter to the counter retrieved by the service provider, which provides a second authentication of the user. If there is no match, the client is not granted access to the service, and at step 631 the service provider 621 may seek to authenticate the user using other methods. If at step 629 there is a match, then the service provider initiates call handling with a CRM server at 630. In one aspect, as will be described with regards to FIG. 7 and FIG. 8, the service provide may generate one or more messages for controlling one of the CRM or the client device to leverage pre-authentication already performed by the service provider.

The next time the contactless card is used for authentication, a different counter value may be selected producing a different diversified symmetric key, making it difficult for malicious parties monitoring communications to decrypt communications. Both the service provider and the contactless card increment the counter according to a pre-determined increment pattern agreed upon by the parties. For example, the counters may increment by 1, or in a pattern, for example in increments of 1 for the first transaction, by 2 for the second, by three for the third, or by 5 for each transaction. Because the contactless card and service provider use a common counter, a common increment pattern, a common Master Key and a common cryptographic algorithm, even though the diversified key will change for each transaction, both the transmitting and receiving devices will have the same key.

As described above, in some examples, the key diversification value may be achieved using a counter value. Other non-limiting examples of the key diversification value include: a random nonce generated each time a new diversified key is needed; the full value of a counter value sent from the transmitting device and the receiving device; a portion of a counter value sent from the transmitting device and the receiving device; a counter independently maintained by the transmitting device and the receiving device but not sent between the two; a one-time-passcode exchanged between the transmitting device and the receiving device; and cryptographic hash of the counter. In some examples as described in the '119 application, one or more portions of the key diversification value may be used by the parties to create multiple diversified keys. For example, a counter may be used as the key diversification value.

In another example, a portion of the counter may be used as the key diversification value. If multiple master key values are shared between the parties, the multiple diversified key values may be obtained by the system and processes described herein. A new diversification value, and therefore a new diversified symmetric key, may be created as often as needed. In the most secure case, a new diversification value may be created for each exchange of sensitive data between the transmitting device and the receiving device. In effect, this may create a one-time use key, such as a single session key.

Various other symmetric encryption/decryption techniques that substituted for those described with regard to FIG. 6 are described in the '119 application, incorporated herein by reference.

Figure 7:
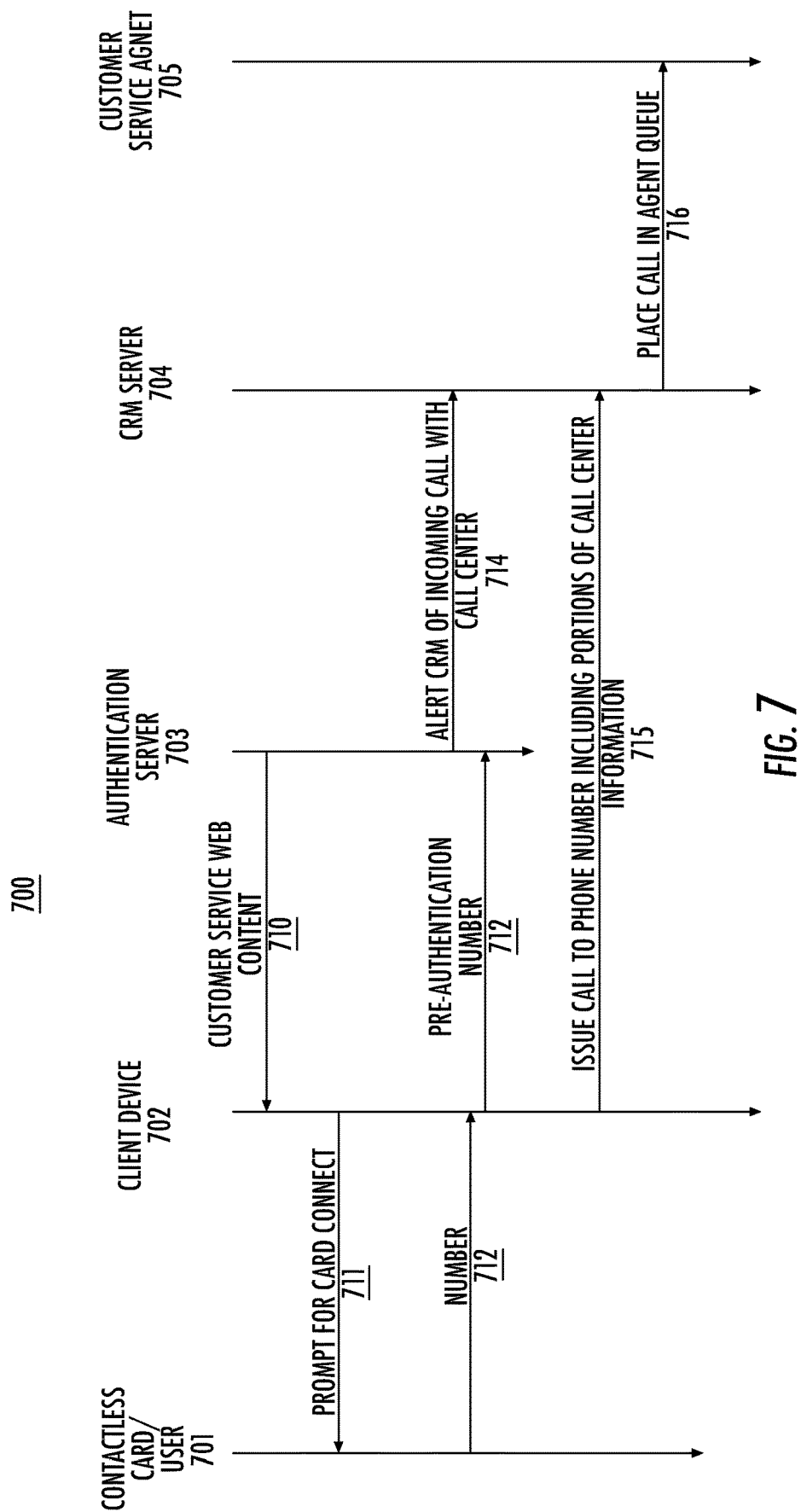
FIG. 7 is a data flow diagram provided to describe exemplary steps that may be performed during one embodiment of a call routing process which uses a contactless card of FIG. 2.
Figure 8:
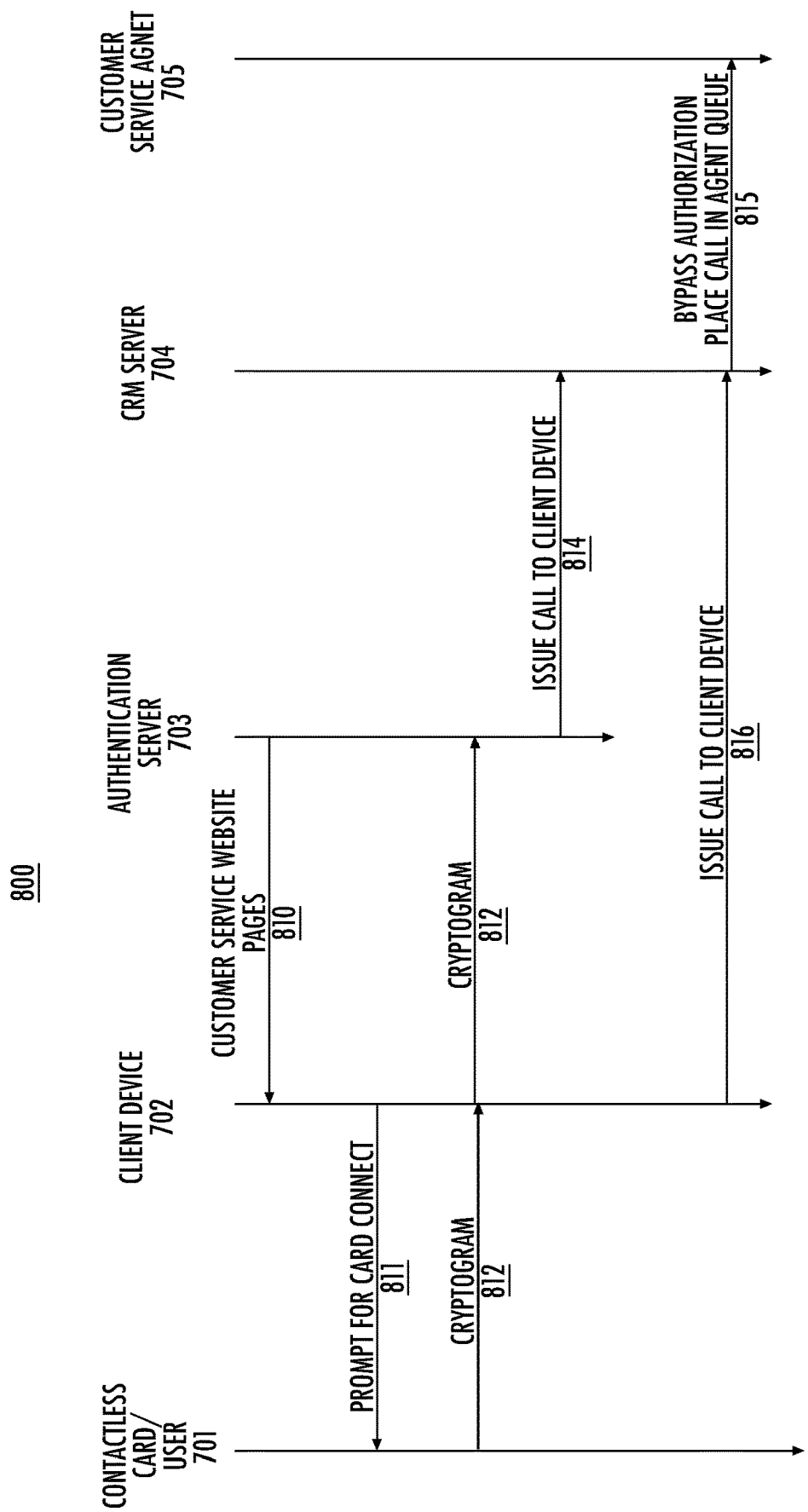
FIG. 8 is a data flow diagram provided to describe exemplary steps that may be performed during another embodiment of a call routing process which uses a contactless card of FIG. 2.

FIG. 7 and FIG. 8 each illustrate exemplary transaction flows that may be performed following pre-authentication of a client seeking access to call center services. In one embodiment, customer information stored on the contactless card may include call center information specific to the client. The call center information may include a number, for example. The number may comprise an IP address, phone number, or other contact address, random number or any portion or combination of an IP address, phone number or other contact address or random number. FIG. 7 illustrates exemplary messaging that may occur between components of a call routing process 700 using call center information from contactless card 701 to define a communication link between client device 702 and customer service agent 705.

Following a multifactor pre-authentication processes shown in FIG. 6, an authentication server 703 of the service provider populates the client interface with customer service web content 710. The web content may include contact information, the contact information comprising a URL, phone number or other contact address for communicating with the CRM server. When the link is selected, a communication link is generated between the client device and the CRM server. According to one embodiment, the customer service web content includes a prompt 711, requesting connection with the contactless card 701.

The contactless card 701, upon receiving the prompt, forwards a stored pre-authentication number 712 to the client device, which in turn provides it to the authentication server 703. In one embodiment, the stored pre-authentication number 712 includes a unique number associated with pre-authentication of a client device. At least a portion of the pre-authentication number may be appended to the contact information when the communication link is generated. For example, the web content 710 may include a link to a customer service phone number 1-800-123-4567. The contactless card may provide a pre-authentication number of 7777 which the client device appends the phone number. Client device initiates a call 715 over the cellular network to -800-123-4567, 7777. The application server alerts the CRM to an incoming call with the appended number from the contactless card at 714. The CRM monitors incoming calls for those with pre-authentication numbers, and bypasses authentication when placing calls at 716 in a customer service agent pipeline.

Although the process of FIG. 7 includes a pre-authentication number stored on a contactless card, in some embodiments a client device may be configured to generate the pre-authentication number for appending to call. The pre-authentication number may be generated in response to a communication with the contactless card, for example following a cryptogram exchange with the contactless card as described in FIG. 6. In some embodiments the pre-authentication number may change for each customer support request. Such an arrangement secures customer support calls against redirection by malicious parties, as imposter client device would not possess the pre-authentication numbers, and authentication thus would not be bypassed at the CRM server.

In other embodiments, as illustrated in FIG. 8, to further protect call handling from malicious interference, call handling is initiated by the customer service agent. Following pre-authentication using the process of FIG. 6, customer support web content 810 is provided to client device. In one embodiment, the content includes a prompt 811 to encourage re-authorization of the client device. Contactless card 812 generates a cryptogram as described above, which is forwarded via client device 702 to authentication server 703 for validation. Once the authentication server validates the cryptogram, at step 814 the authentication server directs the CRM server to bypass authorization of a call. At step 815 the call is placed in the call agent queue, bypassing authorization, and at step 816 CRM initiates a back-channel call. Here the back-channel call is a call initiated over a communication link established directly between a server (for example the CRM server) to the client device phone number, IP address, etc.

In some embodiments, the step of re-authentication may happen following initiating of the call at step 816 by the customer service agent 705, to ensure that the call was not re-directed between a previous authentication and call handling. Methods that may be used by a customer service agent to re-authenticate or further authorize client access will be described in more detail below. Such embodiments may be beneficial when there is a delay between a previous authentication and call handling, for example, a long wait in the customer service queue, or a scheduled call back.

Figure 9:
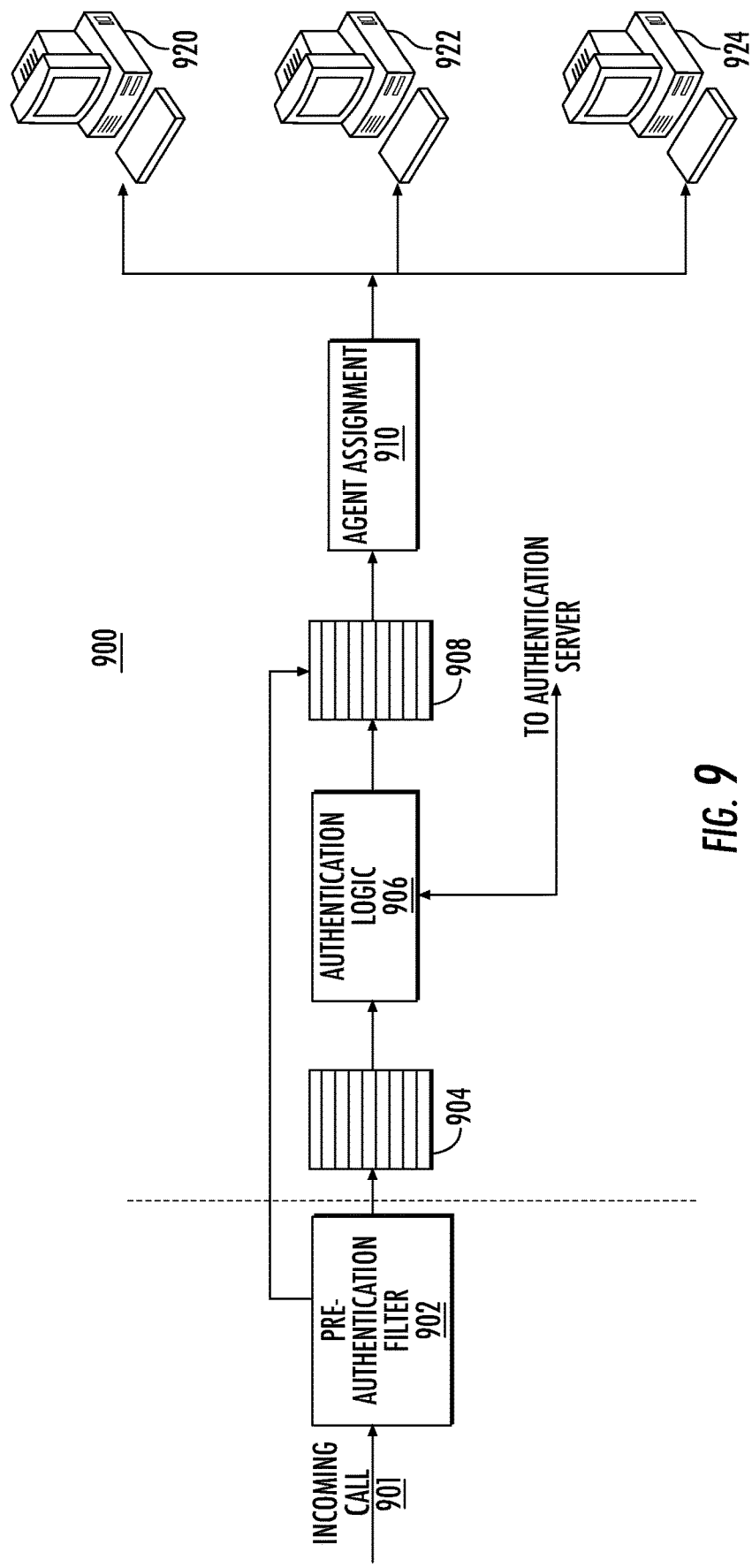
FIG. 9 is a block diagram illustrating exemplary call handling pipelines in a call service center that accepts pre-authenticated service requests.

FIG. 9 illustrates several exemplary components of one embodiment of a CRM service 900. CRM service 900 is shown to include authentication logic 906 and agent assignment unit 910. Incoming calls 901 are forwarded to a pre-authentication filter 902. Pre-authentication filter 902 may store pre-authentication numbers received from an authentication server as described above. Incoming calls which have not been pre-authenticated are forwarded to authentication queue 904. Authentication logic retrieves incoming calls from authentication queue 904 and cooperates with an authentication server (not shown) to validate clients using any combination of authentication methods described above. Once authenticated, calls are forwarded to queue 908.

Incoming calls that are determined to be pre-authenticated are forwarded directly from the pre-authentication filter 902 to the queue 908. Advantageously to minimize the potential for malicious interference, once a call having a stored pre-authentication number is bypassed in this manner, the pre-authentication number is deleted from the pre-authentication filter 902.

Queue 908 thus stores authenticated calls, which are assigned to agents 920, 922, 924 for handling by agent assignment unit 910 in accordance with resource loading. With such an arrangement, pre-authenticated calls can be intelligently routed at a customer call center to minimize handling delays.

Accordingly, a system and method have been described that leverage multi-factor authentication features of a service provider and intelligent call routing to increase security and efficiency at a customer call center. According to another aspect, it is realized that the advantages of the authentication processes described above may be further leveraged by the customer service agent during call handling. For example, the customer service agent may request increased levels of authentication to control client information access with finer granularity or to validate continued client authenticity. Although the multi-factor authentication process of FIG. 6 is described as beneficial for authenticating clients prior to allowing access to high-risk services, it is appreciated that even within high-risk services there are data and actions that pose greater potential to compromising a client account, and that should therefore have restricted access.

For example, there is a higher risk in disclosing an individual's account password than an individual's account balance. Further, there is a greater risk in allowing an individual to modify a phone number or email, as these contact measures are typically used during password modification, and if a malicious user were to modify these data, access to the account by the proper client may be lost.

Figure 10:
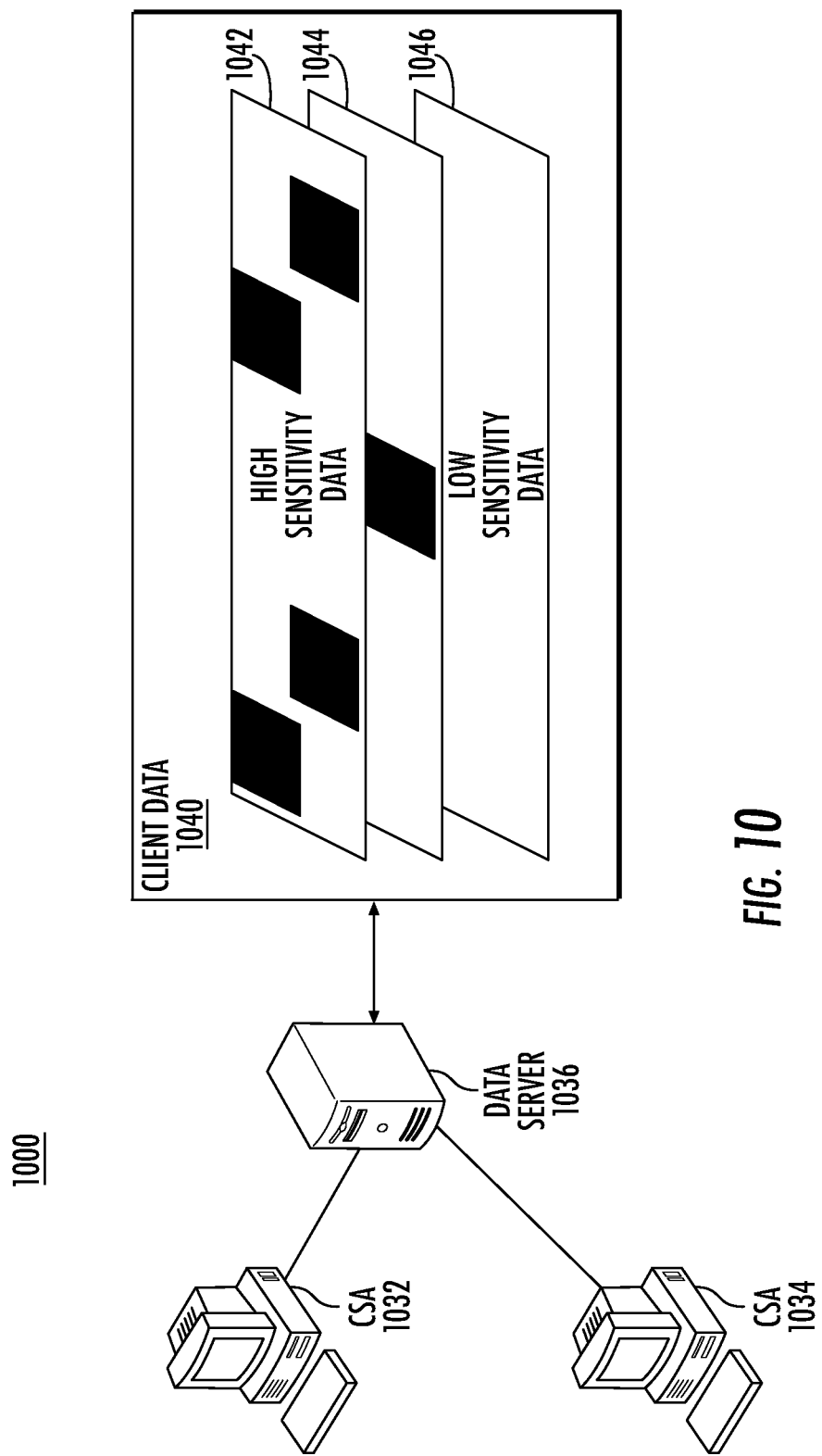
FIG. 10 is a block diagram provided to illustrate layered security controls that may be provided to client data.

Referring briefly to FIG. 10, a block diagram of a subset of exemplary components of a system 1000 operating according to aspects of the invention may comprise a plurality of customer service agents (CSA) 1032, 1034 which access client data 1040 using a data server 1036. The client data 1040 is conceptually apportioned into a tiered data structure, including high sensitivity data 1042, medium sensitivity data 1044 and low sensitivity data 1046. Each tier is thus associated with a different level of data sensitivity and concomitantly a different degree of access control. In some embodiments, certain sensitive data may be made unavailable to unauthorized parties as indicated by the shaded data items such as data item 1045.

Accordingly, prevent account takeover fraud, in one embodiment a customer service agent (or software executing on a customer service agent workstation) may proactively request further factor authentication during a call. For example, the customer service agent may affirmatively select a button on a graphic user interface (GUI) dashboard to generate a request to an authentication server to execute an authentication process. Alternatively, the customer service may select a data element on a screen that is indicated as having restricted access, and the selection may proactively result in the generation of further factor authentication.

The generated further factor authentication request may take many forms that preferably validate both that the device that has initiated the access request is associated with the client and is in the physical possession of the client (or someone authorized by the client). For example, a 'push' message may be issued by the authentication server to the client device, with the push message including a prompt that requests authentication data that is either personal to an authorized device or personal to an authorized client.

For example, such authentication methods may include, but are not limited to an in-application notification (such as the CaptialOne® SwiftID in app challenge), a Short Message Service (SMS) code exchange and the contactless card authentication process described with regard to FIG. 6.

A SwiftID in-application challenge authenticates clients by capturing, at registration, an image of the client's phone. Clients swipe their phone screen upon receipt of a push notification from the authentication server to confirm their activity. SwiftID confirms authenticity by comparing the captured image of the phone to the registered image it has on file, validating the client upon correlation of the images. A SMS code exchange involves a unique code being pushed to pre-validated contact information for a client, and the client evidencing possession of the device by entry of the code in a service provider app.

As described with regard to FIG. 6, contactless card authentication methods use NFC communication channels as described above to exchange messages with the contactless card the contactless card cooperates to provide second factor authentication through a combination of symmetric keys, symmetric cryptographic processing, and counters.

Figure 11:
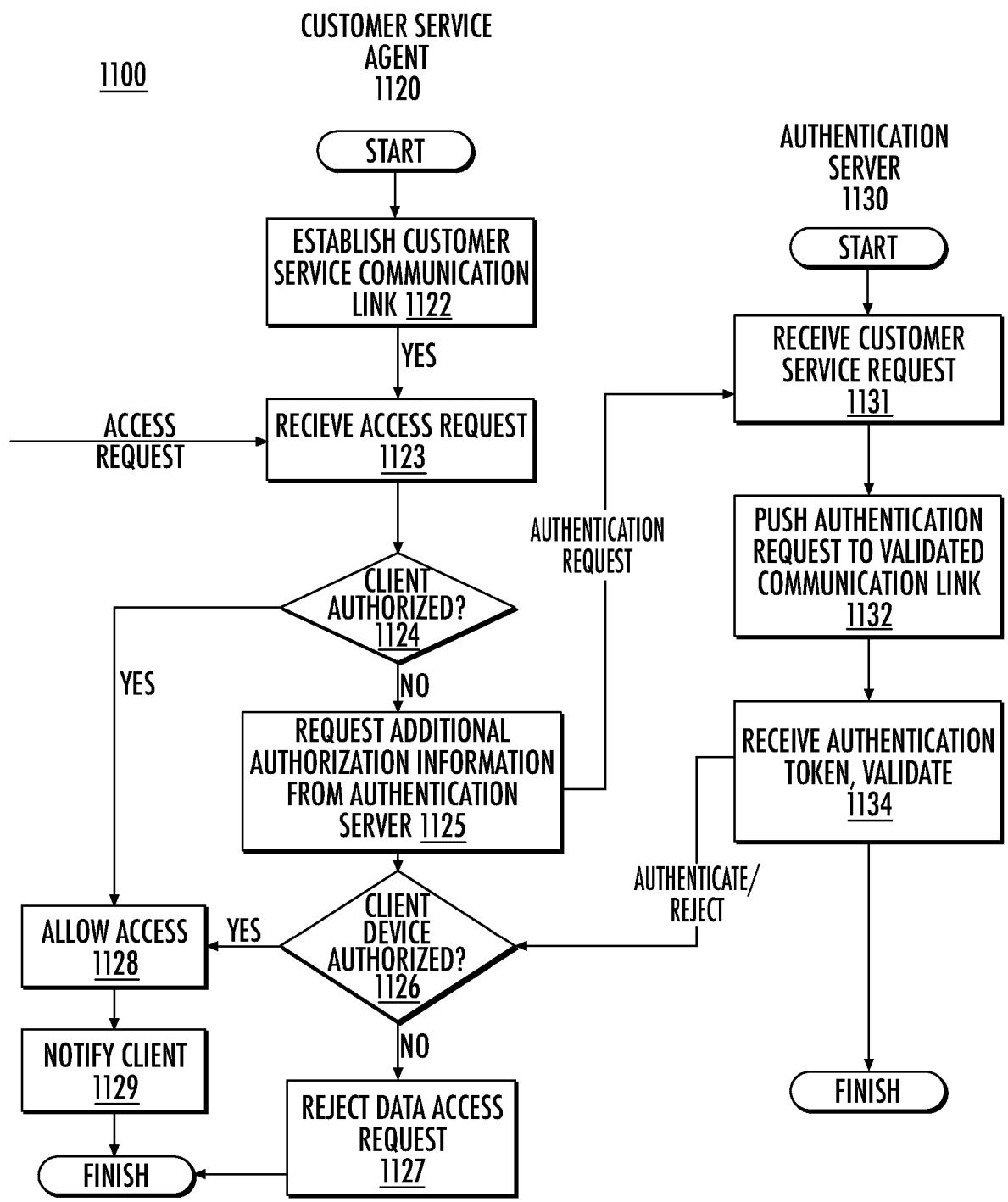
FIG. 11 is a flow diagram provided to describe exemplary steps that may be performed by a customer service agent and authorization service in one embodiment.

Referring now to FIG. 11, exemplary steps that may be performed in one embodiment of a customer service authentication process 1100 utilizing aspects of the present invention will now be described. The customer service authentication process may be implemented as a software program operating on a workstation of a customer service agent that operates in response to inputs from the customer service agent to execute the steps of the process of FIG. 11. For the purposes of the description below, operations described as performed by the customer service agent are meant to include those performed both by an operator of the software and by the software itself.

At step 1122 the customer service agent 1120 establishes a communication link with a client, for example using the process described with regards to FIGS. 1-9 where preferably the client is pre-authenticated prior to call handling.

At step 1123 the customer service agent 1120 receives an access request from the client. At step 1124 the customer service agent determines whether the client is authorized for the access. As mentioned previously, it is appreciated that there may be multiple levels of authorization associated with client data, where lower risk data, services or functions may be made more freely accessible than higher risk data, services or functions. Thus, the pre-authentication that has already been performed may be sufficient for customer service call handling, or additional authentication may be desired. However, in some situations, such as changing an email address or phone number, such pre-authentication may not be sufficient. According to one aspect, each attempted access has associated therewith an authorization level that must be satisfied before the access is permitted.

In some embodiments, the authentication server may store, for each client, an authorization level for the client. In one embodiment, the authorization level may be represented as a numerical scale, and a value may be stored for each client as part of client data that is stored as client data in database 130.

At step 1124, the customer service agent determines whether the client is authorized for the requested access by comparing the authorization level of the access request to the authorization level of the requesting client. If the client is authorized, then the process proceeds to step 1128, where the access is permitted. For example, in some embodiments approval of such access may make sensitive information visible to one or both of the customer service agent and the client. In other embodiments, approval may unlock data fields, allowing modification.

At step 1129, a notification is forwarded to the client. In one embodiment, the notification is forwarded to a pre-verified contact address of the client, for example, an email sent to a pre-validated email address or a text message sent to a pre-validated phone number. Preferably the communication channel used to forward the notification differs from the communication channel used by the client to request the access to information. For example, a client may request access using a web application, and the notification may be sent to an email address supported by an independent mail application. Providing notification to the client using a different communication channel helps to reduce the opportunity for a malicious third party to pose as the client to gain access. Although the notification step 1129 is shown to occur following access at step 1128, in various embodiments such notification may occur prior to permitting access, with a delay to allow for remediation in the event that the client did not issue such request.

If, at step 1124, it is determined that the initial pre-authorization is insufficient for the requested access, at step 1125 the customer service agent requests additional authentication from the server and processed to step 1126 to await authentication results.

At step 1131, when the authentication server receives the authentication request, at step 1132 the authentication server pushes an authentication request to the client. According to one aspect, a back-channel communication link may be established between the authentication server and the client device using a pre-validated communication channel. For example, the authentication server may store for one or more pre-validated contact information for each client, including but not limited to phone numbers, Internet Mobile Equipment Identifier (IMEI), Internet Protocol (IP) addresses, etc. A 'push' request may be sent to the client using the pre-validated contact information, where a 'push' request includes a request for a particular form of authentication information (i.e., SwiftID, SMS code, cryptogram, etc.). By pushing the authentication request to the client using a different channel than that over with the client seeks access, the opportunity for an imposter to be granted access to sensitive information is reduced.

In addition to pushing to pre-validated contacts, alternatively in some embodiments the push message and associated authentication response may be exchanged between the client and the authentication server using a session identifier associated with the client/customer service agent communication session. A session ID is a unique number that a web site's server assigns to a client for the duration of that client's visit (session). Because it is a unique time limited value, it is often difficult for hackers to successfully decode and intrude upon session communications. The session ID can be stored as a cookie, form field, or URL (Uniform Resource Locator) at both the customer service agent and client devices. Many servers use algorithms that involve more complex method of generating session identifiers, and thus forwarding communications using the session identifier adds a further layer of security to client/customer service agent communications.

At step 1134, the authentication server 1130 receives an authentication token (i.e., phone image, SMS code, cryptogram) which is used to authenticate the client device. The authentication server 1130 compares the token to an expected value retrieved from the data store and forwards one of an Authenticate or a Reject signal to the customer service agent.

If at step 1126 the customer service agent receives a Reject signal, the client is not authenticated, and the process proceeds to step 1127, where the access request is rejected. In such an event, the customer service agent may seek alternate means of authentication, may terminate the call or may forward the call for fraud handling. If at step 1126 the customer service agent receives an Authenticate signal, the requested access is permitted at step 1128 and an email is forwarded at step 1129 to notify the client of the access request.

In some embodiments, the implementation of a requested modification may be delayed pending a response to the email from the client. For example, the email message may include a request for an affirmative indication from the client that the access request was authorized. In some embodiments, the email request may request further authentication, for example, a SwiftID, SMS code or cryptogram exchange.

Figure 12B:
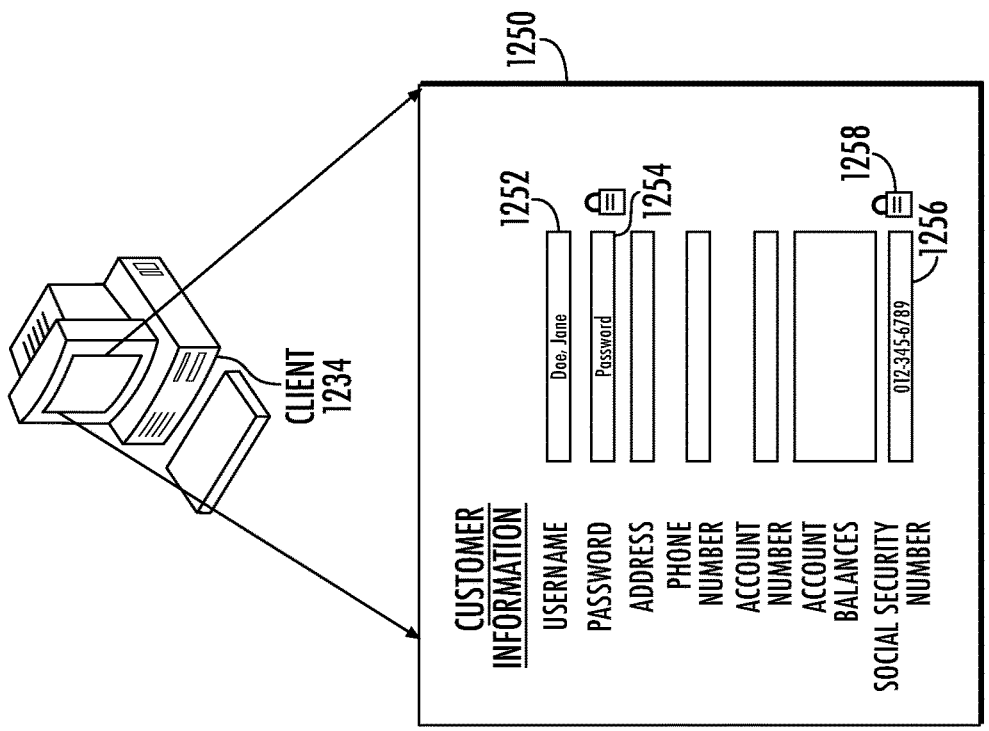
FIGS. 12A and 12B illustrate exemplary graphic user interface (GUI) content that may be displayed to a customer service agent and client in various embodiments.
Figure 12A:
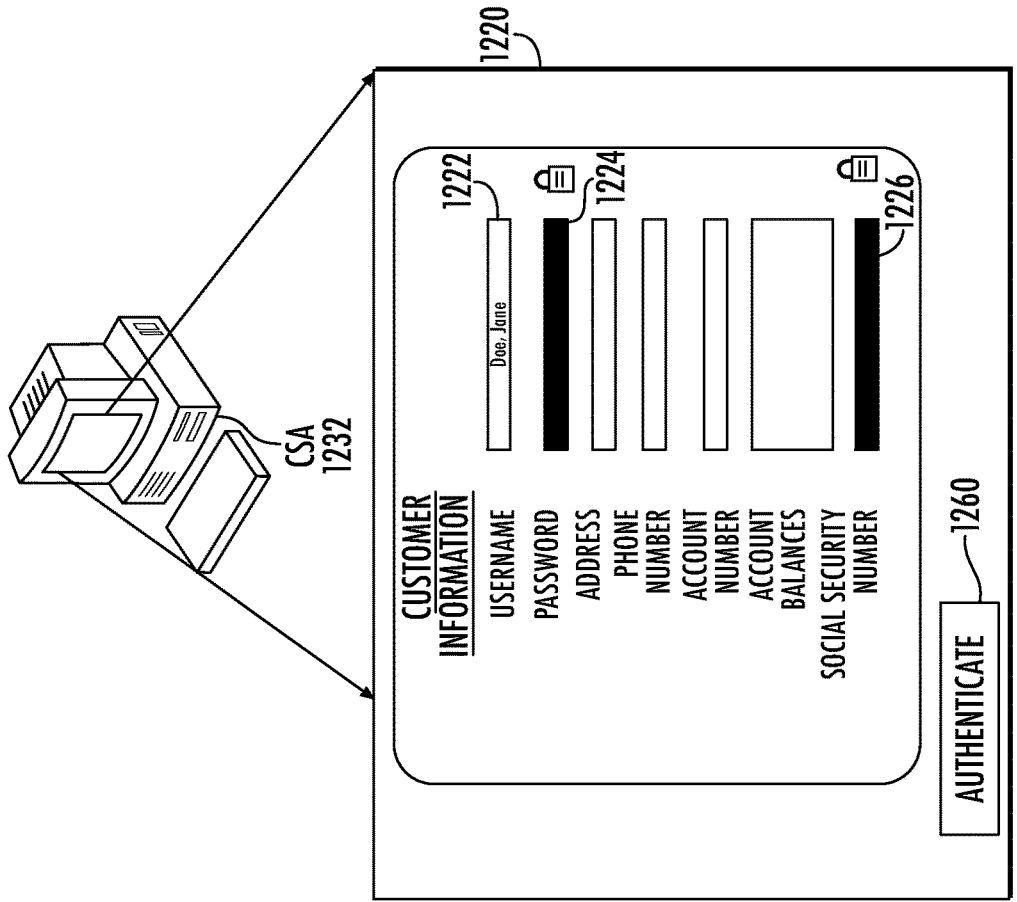

FIG. 12A and FIG. 12B illustrate exemplary graphic user interface (GUI) displays of a customer service agent (CSA) 1232 and a client 1234 which may communicate using the processes described above with regard to FIG. 11. When a customer service agent receives a call for handling, the customer service screen 1220 may include a variety of fields that display information about the client, such as a username 1222, a password 1224 and a social security number 1226. The client display 1250 may similarly include a subset of one or more of the information fields displayed to the customer service agent, including a username 1252, password 1254 and social security number 1256. According to one aspect, as mentioned above, certain information may not be viewable to one or both of the CSA 1232 and/or the client depending upon the authorization level of each of the entities. Thus, in FIG. 12A, the CSA 1232 is not authorized to view the client's password 1224 or social security number 1226. The client 1234, however, is authorized to view these fields. A lock icon 1258 indicates, however, that the client is not authorized to modify the field without further authentication. The process of further authenticating the client using the steps for example of FIG. 11 may be initiated in a variety of manners, including by the customer service agent selecting the Authenticate button 1260 on their display or by one or both of the CSA 1232 or the client 1234 selecting one of the lock icons such as lock icon 1258. In addition, as described above, at any point during call handling if the CSA 1232 is suspicious of the authenticity of the client, the CSA may select the Authenticate button 1260 to initiate the authentication process.

Accordingly, a system and method has been shown and described that reduces the opportunity for malicious access of client information during customer service transactions by validating client authenticity using multiple different communication channels. Such authentication may be performed following pre-authentication, or in place of pre-authentication.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of functional blocks or units that might be implemented as program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but still co-operate or interact with each other.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, various features are grouped together in a single embodiment to streamline the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A device including:
an interface configured to support a first communication channel between the device and a customer support service, the first communication channel configured to forward an access request by the device to the customer support service, the access request seeking information of the customer support service related to a client associated with the device;
the interface configured to support a second communication channel between the device and an authorization server, the second communication channel established by the authorization server in response to a request from the customer support service to the authorization server for validation of the access request;
a near field communication interface, configured to retrieve a cryptogram from a contactless card associated with the client in response to an authorization request from the authorization server over the second communication channel, the cryptogram generated by the contactless card using a key and a counter value stored on the contactless card; and
the interface configured to forward the cryptogram to the authorization server over the second communication channel to enable the authorization server to validate the cryptogram using stored a stored key and a stored counter value stored by the authorization server for the client.

2. The device of claim 1 wherein the second communication channel generated is generated by the authorization server using pre-verified contact information for the client.

3. The device of claim 1 wherein the first communication channel comprises an application session established between the device and the customer support service following a first factor authentication exchange between the device and the customer support service.

4. The device of claim 1 wherein the second communication channel delivers a second factor authentication request comprising a contactless card cryptogram request, a Short Message Service (SMS) code request, an in-application notification or a combination thereof.

5. The device of claim 1, wherein the counter value stored on the contactless card changes for each access of the customer support service.

6. The device of claim 1, wherein the cryptogram is generated by a cryptogram generating applet stored in a memory of the contactless card using the counter value.

7. The device of claim 2 wherein the pre-verified contact information includes an Internet Mobile Equipment Identifier (IMEI), a phone number of a pre-verified device, an email address or combination thereof.

8. The device of claim 3 wherein the first communication channel comprises an application session identifier.

9. The device of claim 8 wherein the second communication channel is further established using the application session identifier.

10. The device of claim 1 wherein the authorization server stores client data comprising an authorization level of the client and the authorization server selectively validates the access request by comparing the authorization level of the client to an access level of information sought by the access request.

11. The device of claim 10 wherein the client data stored by the authorization server includes account information, a password, an address, and/or a phone number, and the access request includes a read request or a modify request.

12. A method for securing communications between a device of a client and a customer support service includes the steps of:
    establishing a first communication channel between the device and the customer support service, the first communication channel supporting an access request for information of the customer support service related to the client;
    forwarding the access request to the customer support service using an application session established between the device and the customer support service following exchange of first factor authentication information between the client and the customer support service, the application session comprising a session identifier;
    receiving, over a second communication channel of the device from an authorization server, a second factor authentication request from the client;
    retrieving, in response to the second factor authentication request, over a near field communication interface of the device, a cryptogram from a contactless card of the client, the cryptogram formed from a key and a counter stored on the contactless card;
    forwarding the cryptogram to the authorization server over the second communication channel; and
    receiving the information related to the access request over the first communication channel when the authorization server determines a match between the cryptogram and an expected cryptogram generated by the authorization server in response to a stored key and a stored counter for the client.

13. The method of claim 12 wherein the second communication channel is established using the session identifier of the first communication channel.

14. The method of claim 13 wherein the second communication channel is generated using pre-verified contact information for the client and the session identifier of the first communication channel.

15. The method of claim 14 further including the step of receiving a notification of the access request by the device using a third communication channel established using the pre-verified contact information.

16. The method of claim 14 wherein the pre-verified contact information comprises an Internet Mobile Equipment Identifier (IMEI) and a phone number of a pre-verified client device, email address of the client or a combination thereof.

17. The method of claim 16 wherein the second factor authentication request forwarded on the second communication channel comprises a contactless card cryptogram request, a Short Message Service (SMS) code request, an in-application notification or combination thereof.

18. The method of claim 12 wherein the counter stored on the contactless card and the stored counter of the authorization server change are each dynamically updated for each access request by the client.

19. The method of claim 12, wherein the step of retrieving the cryptogram from the contactless card of the client includes the step of issuing a near field communication read operation of a cryptogram generating applet stored on the contactless card.

20. A method for validating an access request made by a device of a client for client information stored by a customer support service, the method including:
    establishing a first communication channel between the device and the customer support service, the first communication channel supporting an access request for information of the customer support service related to the client;
    forwarding the access request to the customer support service using an application session established between the device and the customer support service following exchange of first factor authentication information between the client and the customer support service, the application session comprising a session identifier;
    receiving, over a second communication channel of the device from an authorization server established by the authorization server using the session identifier, a second factor authentication request from the client, the second communication channel generated using the session identifier and pre-verified contact information for the client;
    receiving, by the device, over a third communication channel established using the pre-verified contact information for the client, a notification of the access request;
    retrieving, in response to the second factor authentication request, over a near field communication interface of the device, a cryptogram from a contactless card of the client, the cryptogram formed from a key and a dynamic counter stored on the contactless card that changes for each access request;
    forwarding the cryptogram to the authorization server over the second communication channel; and
    receiving the information related to the access request over the first communication channel when the authorization server determines a match between the cryptogram and an expected cryptogram generated by the authorization server in response to a stored key and a stored counter for the client.

\* \* \* \* \*